(12) United States Patent
Maoz et al.

(10) Patent No.: US 10,515,176 B1
(45) Date of Patent: Dec. 24, 2019

(54) SYSTEM AND METHOD FOR VISUALIZING COMPONENT DATA ROUTES

(71) Applicant: Cadence Design Systems, Inc., San Jose, CA (US)

(72) Inventors: Uri Joel Maoz, Austin, TX (US); Ronen Shoham, Austin, TX (US)

(73) Assignee: Cadence Design Systems, Inc., San Jose, CA (US)

(*) Notice: Subject to any disclaimer, the term of this patent is extended or adjusted under 35 U.S.C. 154(b) by 523 days.

(21) Appl. No.: 15/298,178

(22) Filed: Oct. 19, 2016

(51) Int. Cl.
*G06F 17/50* (2006.01)

(52) U.S. Cl.
CPC ...... *G06F 17/5077* (2013.01); *G06F 17/5081* (2013.01)

(58) Field of Classification Search
USPC .......................................... 716/139
See application file for complete search history.

(56) References Cited

U.S. PATENT DOCUMENTS

| 2009/0070493 A1* | 3/2009 | Riocreux | G06F 17/5045 |
| | | | 710/16 |
| 2014/0059524 A1* | 2/2014 | Kee | G06F 8/34 |
| | | | 717/154 |

* cited by examiner

*Primary Examiner* — Eric D Lee
(74) *Attorney, Agent, or Firm* — Mark H. Whittenberger, Esq.; Holland & Knight LLP

(57) ABSTRACT

The present disclosure relates to a computer-implemented method for visualizing one or more IP-XACT component data routes is provided. The method may include receiving, using at least one processor, an IP-XACT description of one or design elements including at least one target ingress interface, and at least one of an initiator egress interface, a memory map and an address space. The method may further include analyzing, using the at least one processor, the IP-XACT description of the one or design elements and displaying a graphical user interface, based upon, at least in part, the IP-XACT description of one or design elements, wherein the graphical user interface is configured to display the at least one target ingress interface, and any number of the initiator egress interface, the memory map and the address space.

20 Claims, 34 Drawing Sheets
(32 of 34 Drawing Sheet(s) Filed in Color)

SYSTEM AND METHOD FOR VISUALIZING COMPONENT DATA ROUTES

FIELD OF THE INVENTION

The present disclosure relates to electronic design automation, and more specifically, to a system and method for visualizing component data routes.

DISCUSSION OF THE RELATED ART

Electronic design automation (EDA) utilizes software tools that may be used in the design and analysis of numerous electronic systems such as printed circuit boards (PCBs) and integrated circuits (ICs). A display may be used as an input at the start of the Design Process, which may specify all of the logical and physical parts on the design.

IP-XACT is an extensible markup language ("XML") format for description of design elements. It is intended to allow the description of any possible variation of design data, and as such it is a very complex format, with many non-trivial abstractions. This makes it extremely hard to write manually, and challenging to automate in a way that any domain-knowledgeable person could find accessible without having to learn IP-XACT. There are currently no visualization tools that assist a designer in understanding IP-XACT. The IP-XACT source needs to be comprehended and data routes worked out by hand. There are currently various editors for IP-XACT, mostly generic XML editors. While helpful with syntactic issues they provide no abstraction when editing data routes, providing no guarantee of semantic correctness.

SUMMARY

In one or more embodiments of the present disclosure, a computer-implemented method for visualizing one or more IP-XACT component data routes is provided. The method may include receiving, using at least one processor, an IP-XACT description of one or design elements including at least one target ingress interface, and at least one of an initiator egress interface, a memory map and an address space. The method may further include analyzing, using the at least one processor, the IP-XACT description of the one or design elements. The method may further include displaying a graphical user interface, based upon, at least in part, the IP-XACT description of one or design elements, wherein the graphical user interface is configured to display the at least one target ingress interface, and any number of the initiator egress interface, the memory map and the address space.

One or more of the following features may be included. In some embodiments, each memory map is configured to be created, deleted, or assigned to a particular target. The initiator may be addressable and may include an assigned address space. The assigned address space may be configured to be adjusted at the graphical user interface. The assigned address space may be segmented into a subrange associated with the assigned address space. The method may include applying a reference scale to one or more connections associated with the graphical user interface. The assigned address space may be assigned a color for display at the graphical user interface.

In some embodiments, a computer-readable storage medium having stored thereon instructions that when executed by a machine result in one or more operations is provided. Operations may include receiving, using at least one processor, an IP-XACT description of one or design elements including at least one target ingress interface, and at least one of an initiator egress interface, a memory map and an address space. Operations may further include analyzing, using the at least one processor, the IP-XACT description of the one or design elements. Operations may further include displaying a graphical user interface, based upon, at least in part, the IP-XACT description of one or design elements, wherein the graphical user interface is configured to display the at least one target ingress interface, and any number of the initiator egress interface, the memory map and the address space.

One or more of the following features may be included. In some embodiments, each memory map is configured to be created, deleted, or assigned to a particular target. The initiator may be addressable and may include an assigned address space. The assigned address space may be configured to be adjusted at the graphical user interface. The assigned address space may be segmented into a subrange associated with the assigned address space. Operations may include applying a reference scale to one or more connections associated with the graphical user interface. The assigned address space may be assigned a color for display at the graphical user interface.

In one or more embodiments of the present disclosure, a system for visualizing one or more IP-XACT component data routes is provided. The system may include a computing device having at least one processor configured to receive an IP-XACT description of one or design elements including at least one target ingress interface, and at least one of an initiator egress interface, a memory map and an address space. The at least one processor may be further configured to analyze the IP-XACT description of the one or design elements. The at least one processor may be further configured to display a graphical user interface, based upon, at least in part, the IP-XACT description of one or design elements, wherein the graphical user interface is configured to display the at least one target ingress interface, and any number of the initiator egress interface, the memory map and the address space.

One or more of the following features may be included. In some embodiments, each memory map may be configured to be created, deleted, or assigned to a particular target. In some embodiments, the initiator may be addressable and includes an assigned address space. The assigned address space may be configured to be adjusted at the graphical user interface. The assigned address space may be segmented into a subrange associated with the assigned address space. The at least one processor may be further configured to apply a reference scale to one or more connections associated with the graphical user interface.

Additional features and advantages of embodiments of the present disclosure will be set forth in the description which follows, and in part will be apparent from the description, or may be learned by practice of embodiments of the present disclosure. The objectives and other advantages of the embodiments of the present disclosure may be realized and attained by the structure particularly pointed out in the written description and claims hereof as well as the appended drawings.

It is to be understood that both the foregoing general description and the following detailed description are exemplary and explanatory and are intended to provide further explanation of embodiments of the invention as claimed.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The accompanying drawings, which are included to provide a further understanding of embodiments of the present disclosure and are incorporated in and constitute a part of this specification, illustrate embodiments of the present disclosure and together with the description serve to explain the principles of embodiments of the present disclosure.

DETAILED DESCRIPTION

Figure 1:
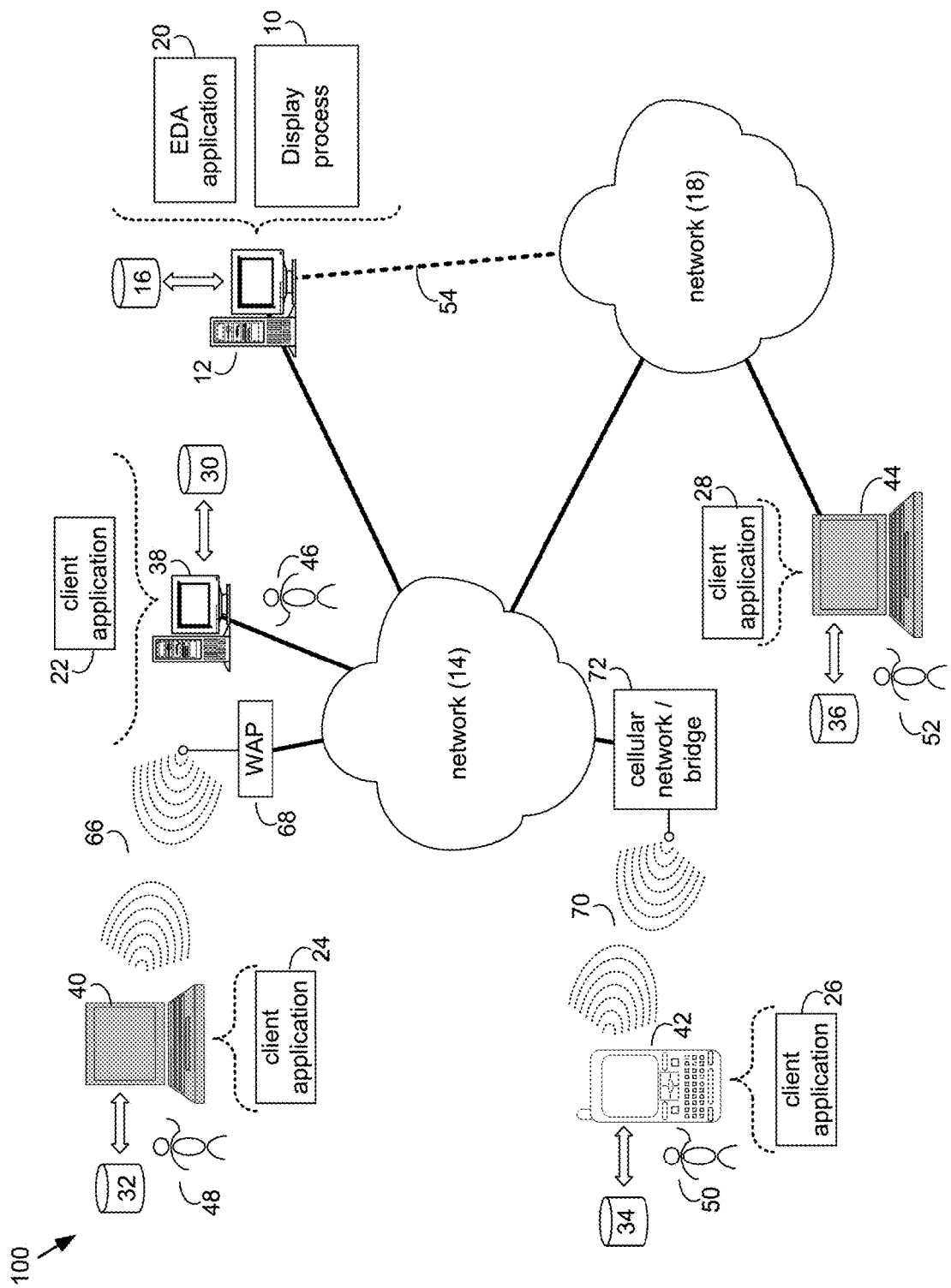
FIG. 1 is a system diagram depicting aspects of the display process in accordance with an embodiment of the present disclosure.

Embodiments of the present disclosure are directed towards a system and method for a way to visualize and edit IP-XACT component data routes. Accordingly, embodiments described herein include a specific visual abstraction for working with component data routes, offering both a way to visualize them, with an internal logic that enables expectable and correct-by-construction editing.

Embodiments of the present disclosure may be configured to make a correct IPXACT routing description understandable to a domain-expert. Accordingly, embodiments included herein may enable a domain expert to create and edit a correct IPXACT routing description, and maintain its correctness. In other words, embodiments of the present disclosure may allow a domain expert to be productive without any IPXACT expertise, by translating the IPXACT modeling into an abstract and accessible description that is "correct by design".

Reference will now be made in detail to the embodiments of the present disclosure, examples of which are illustrated in the accompanying drawings. The present disclosure may, however, be embodied in many different forms and should not be construed as being limited to the embodiments set forth herein. Rather, these embodiments are provided so that this disclosure will be thorough and complete, and will fully convey the concept of the disclosure to those skilled in the art.

As will be appreciated by one skilled in the art, the present disclosure may be embodied as a method, system, or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer readable medium may be a computer readable signal medium or a computer readable storage medium. A computer-usable, or computer-readable, storage medium (including a storage device associated with a computing device or client electronic device) may be, for example, but not limited to, an electronic, magnetic, optical, electromagnetic, infrared, or semiconductor system, apparatus, or device, or any suitable combination of the foregoing. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device. In the context of this document, a computer-usable, or computer-readable, storage medium may be any tangible medium that can contain, or store a program for use by or in connection with the instruction execution system, apparatus, or device.

A computer readable signal medium may include a propagated data signal with computer readable program coded embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present disclosure is described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Referring to FIG. 1, a number of processes that may reside on and may be executed by server computer 12, which may be connected to network 14 (e.g., the Internet or a local area network) are provided. Embodiments of the present disclosure are directed towards a display process 10, which is discussed in further detail hereinbelow. Examples of server computer 12 may include, but are not limited to: a personal computer, a server computer, a series of server computers, a mini computer, and a mainframe computer. Server computer 12 may be a web server (or a series of servers) running a network operating system, examples of which may include but are not limited to: Microsoft® Windows® Server; Novell® NetWare®; or Red Hat® Linux®, for example. (Microsoft and Windows are registered trademarks of Microsoft Corporation in the United States, other countries or both; Novell and NetWare are registered trademarks of Novell Corporation in the United States, other countries or both; Red Hat is a registered trademark of Red Hat Corporation in the United States, other countries or both; and Linux is a registered trademark of Linus Torvalds in the United States, other countries or both.) Additionally/alternatively, the processes described herein may reside on and be executed, in whole or in part, by a client electronic device, such as a personal computer, notebook computer, personal digital assistant, or the like.

The instruction sets and subroutines of display process 10, which may include one or more software modules, and which may be stored on storage device 16 coupled to server computer 12, may be executed by one or more processors (not shown) and one or more memory modules (not shown) incorporated into server computer 12. Storage device 16 may include but is not limited to: a hard disk drive; a solid state drive, a tape drive; an optical drive; a RAID array; a random access memory (RAM); and a read-only memory (ROM). Storage device 16 may include various types of files and file types including but not limited, to hardware description language ("HDL") files, which may contain the port type descriptions and executable specifications of hardware blocks.

Server computer 12 may execute a web server application, examples of which may include but are not limited to: Microsoft IIS, Novell Webserver™, or Apache® Webserver, that allows for HTTP (e.g., HyperText Transfer Protocol) access to server computer 12 via network 14 (Webserver is a trademark of Novell Corporation in the United States, other countries, or both; and Apache is a registered trademark of Apache Software Foundation in the United States, other countries, or both). Network 14 may be connected to one or more secondary networks (e.g., network 18), examples of which may include but are not limited to: a local area network; a wide area network; or an intranet, for example.

Server computer 12 may execute an electronic design automation (EDA) application (e.g., EDA application 20), examples of which may include, but are not limited to those available from the assignee of the present application. EDA application 20 may interact with one or more EDA client applications (e.g., EDA client applications 22, 24, 26, 28). EDA application 20 may be referred to herein as a design tool.

Display process 10 may be a stand alone application, or may be an applet/application/script that may interact with and/or be executed within EDA application 20. In addition/as an alternative to being a server-side process, display process 10 may be a client-side process (not shown) that may reside on a client electronic device (described below) and may interact with an EDA client application (e.g., one or more of EDA client applications 22, 24, 26, 28). Further, the display process 10 may be a hybrid server-side/client-side process that may interact with EDA application 20 and an EDA client application (e.g., one or more of client applications 22, 24, 26, 28). As such, display process 10 may reside, in whole, or in part, on server computer 12 and/or one or more client electronic devices.

The instruction sets and subroutines of EDA application 20, which may be stored on storage device 16 coupled to server computer 12 may be executed by one or more processors (not shown) and one or more memory modules (not shown) incorporated into server computer 12.

The instruction sets and subroutines of EDA client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory modules (not shown) incorporated into client electronic devices 38, 40, 42, 44 (respectively). Storage devices 30, 32, 34, 36 may include but are not limited to: hard disk drives; solid state drives, tape drives; optical drives; RAID arrays; random access memories (RAM); read-only memories (ROM), compact flash (CF) storage devices, secure digital (SD) storage devices, and a memory stick storage devices. Examples of client electronic devices 38, 40, 42, 44 may include, but are not limited to, personal computer 38, laptop computer 40, mobile computing device 42 (such as a smart phone, netbook, or the like), notebook computer 44, for example. Using client applications 22, 24, 26, 28, users 46, 48, 50, 52 may access EDA application 20 and may allow users to e.g., utilize display process 10.

Users 46, 48, 50, 52 may access EDA application 20 directly through the device on which the client application (e.g., client applications 22, 24, 26, 28) is executed, namely client electronic devices 38, 40, 42, 44, for example. Users 46, 48, 50, 52 may access EDA application 20 directly through network 14 or through secondary network 18. Further, server computer 12 (e.g., the computer that executes EDA application 20) may be connected to network 14 through secondary network 18, as illustrated with phantom link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 66 established between laptop computer 40 and wireless access point (e.g., WAP) 68, which is shown directly coupled to network 14. WAP 68 may be, for example, an IEEE 802.11a, 802.11b, 802.11g, Wi-Fi, and/or Bluetooth device that is capable of establishing wireless communication channel 66 between laptop computer 40 and WAP 68. Mobile computing device 42 is shown wirelessly coupled to network 14 via wireless communication channel 70 established between mobile computing device 42 and cellular network/bridge 72, which is shown directly coupled to network 14.

As is known in the art, all of the IEEE 802.11x specifications may use Ethernet protocol and carrier sense multiple access with collision avoidance (e.g., CSMA/CA) for path sharing. The various 802.11x specifications may use phase-shift keying (e.g., PSK) modulation or complementary code keying (e.g., CCK) modulation, for example. As is known in the art, Bluetooth is a telecommunications industry specification that allows e.g., mobile phones, computers, and personal digital assistants to be interconnected using a short-range wireless connection.

Client electronic devices 38, 40, 42, 44 may each execute an operating system, examples of which may include but are not limited to Microsoft Windows, Microsoft Windows CE®, Red Hat Linux, or other suitable operating system. (Windows CE is a registered trademark of Microsoft Corporation in the United States, other countries, or both.).

Figure 2:
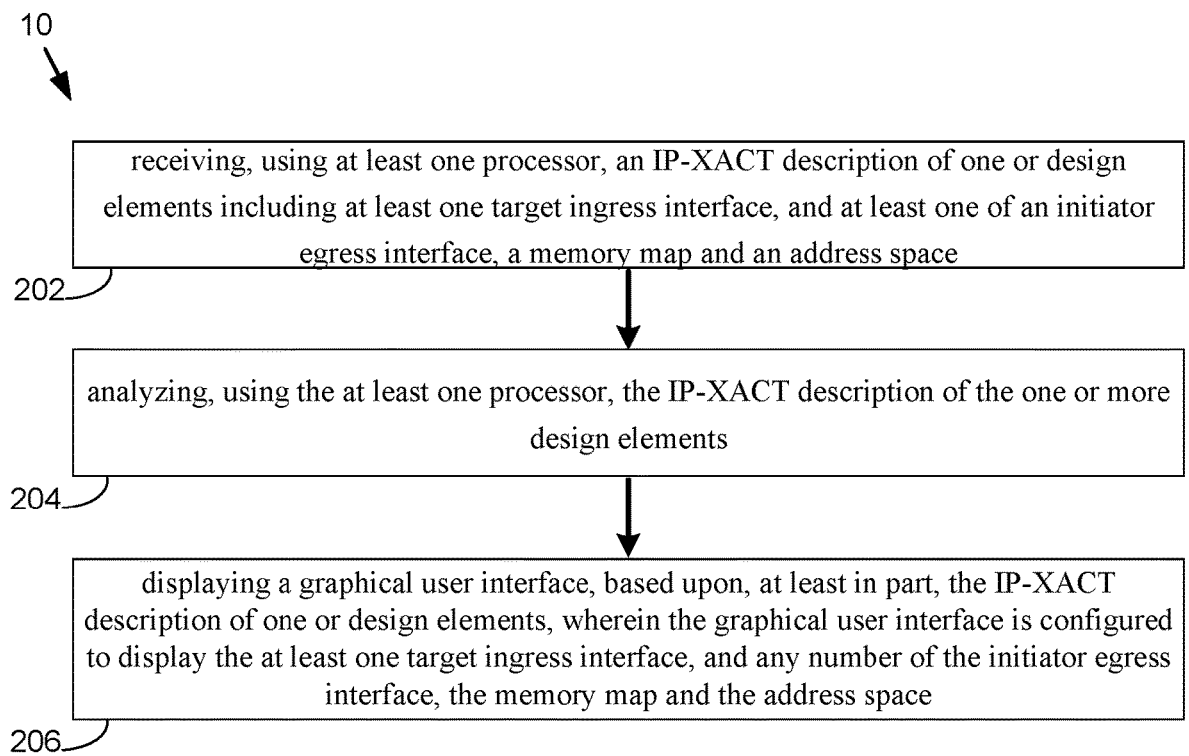
FIG. 2 is a flowchart depicting operations consistent with the display process of the present disclosure.

Referring now to FIG. 2, an embodiment of display process 10 for visualizing one or more IP-XACT component data routes is provided. The method may include receiving (202), using at least one processor, an IP-XACT description of one or design elements including at least one target ingress interface, and at least one of an initiator egress interface, a memory map and an address space. The method may further include analyzing (204), using the at least one processor, the IP-XACT description of the one or design elements and displaying (206) a graphical user interface, based upon, at least in part, the IP-XACT description of one or design elements, wherein the graphical user interface is configured to display a graphical user interface, based upon, at least in part, the IP-XACT description of one or design elements, wherein the graphical user interface is configured to display the at least one target ingress interface, and any number of the initiator egress interface, the memory map and the address space. In some embodiments, the at least one target (ingress) interface, and any number of initiator (egress) interfaces, memory maps and address spaces may together define data routing within and through the described component.

In some embodiments, EDA application 20 and/or display process 10 may support a variety of languages and/or standards. EDA application 20 may support one or more software extensions and may be used in conjunction with one or more EDA tools such as those available from the Assignee of the subject application.

The phrase "component data route", as used herein, may describe how memory is mapped between addressable interfaces of a component. For every ingress interface (termed "target" herein) it provides a mechanism to describe the memory address ranges at which are mapped memory address ranges of either egress interfaces (termed "initiators" herein), or internal component memory.

In some embodiments, targets may be "mapped" to "memory maps", and initiators may be addressed using "address spaces". The same address space "segment" may be addressed from multiple memory maps at different addresses, and the same memory map address range can be conditionally "remapped" so that it may reach different destinations based on arbitrary conditions.

A typical IP-XACT specification may contain many more options and complications, and users struggle with the amount of expertise needed to describe even a routing scenario. This, combined with the difficulty of understanding an existing description and understanding various other issues makes working with such a specification difficult.

Accordingly, embodiments of display process 10 may be configured to provide a visual description such as a graphical user interface and/or diagram such as that shown in FIG.

Figure 3:
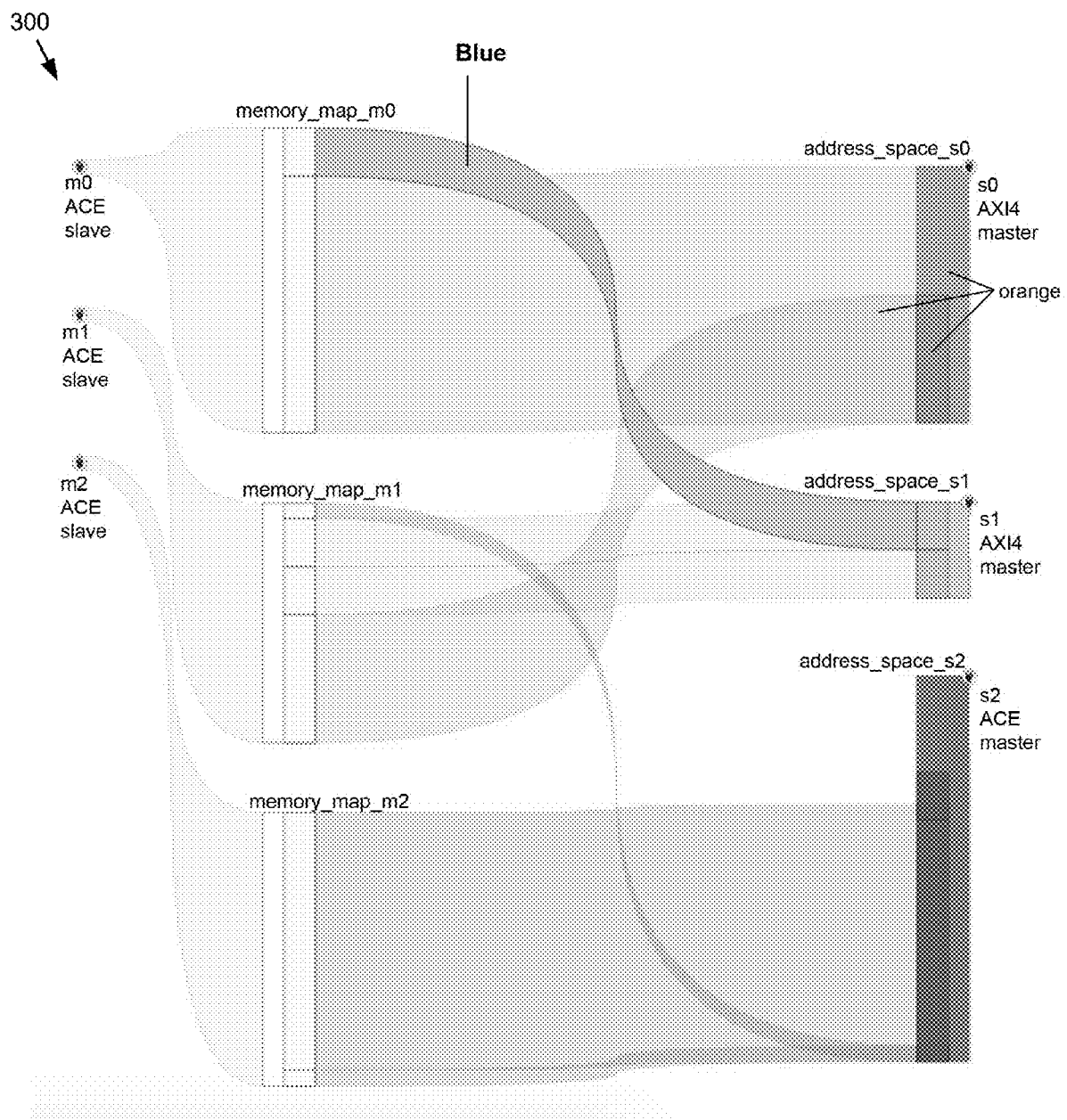
FIG. 3 is a diagram depicting aspects of the display process in accordance with an embodiment of the present disclosure.

3. FIG. 3 depicts an example of a small 3×3 interconnect as visualized using display process 10. As is shown in FIG. 3, data may flow from left to right. Specifically, in some embodiments, from left to right there may be a number of columns displayed (e.g., targets, memory maps, initiators (addressed or unaddressed), etc.

In some embodiments, the interfaces (e.g., targets, initiators, etc.) may not be edited as part of the data route description. Memory maps may be created, deleted and assigned to targets. In some embodiments, memory map creation may only be triggered from a target. Additionally and/or alternatively, memory maps may be created empty. Once created, memory maps may be separate entities to their creating target.

In some embodiments, initiators may be made addressable, or if addressable may be cleared of addressing. Being made addressable may refer to creating and/or assigning an address space, and/or assigning an existing address space already assigned to another initiator. It should be noted that, in some embodiments, there are no unassigned address spaces (e.g., un-assigning the last initiator deletes the address space).

In some embodiments, an address spaces may be dragged to a memory map, which creates and maps a suitably sized subspace. Additionally and/or alternatively, an address space may have segments created. In this way, a segment is essentially a named a range. Once created a segment may be mapped like a full address space. In operation, dragging a space/segment to an existing subspace of the same size may allow for the creation of an interleaved mapping.

In some embodiments, and with regard to connections and sizes, the sizes may be relative rather than absolute. When the graphical user interface and/or diagram is created or edited a reference scale may be calculated so the diagram is reasonably sized yet relatively correct. Additionally and/or alternatively, connections between sized entities may be as wide as the sizes they connect.

In some embodiments, the descriptions and/or labels displayed on the GUI may include minimal details in some examples (e.g., placed next to each entity). For example, interfaces may include name, type, mode, etc. Memory maps and address spaces may include name only. Any further details are available as a tooltip.

In some embodiments, display process 10 may include various colors and other indicators to assist the designer in better understanding the specification. For example, address spaces may be assigned a color. Additionally and/or alternatively, the color of an address space may be inherited by its segments. In some embodiments, connections may be configured to inherit the color of the addressed entity they reach. Colors may be selected from a limited palette aiming to provide optimal balance of uniqueness and color difference.

Figure 4:
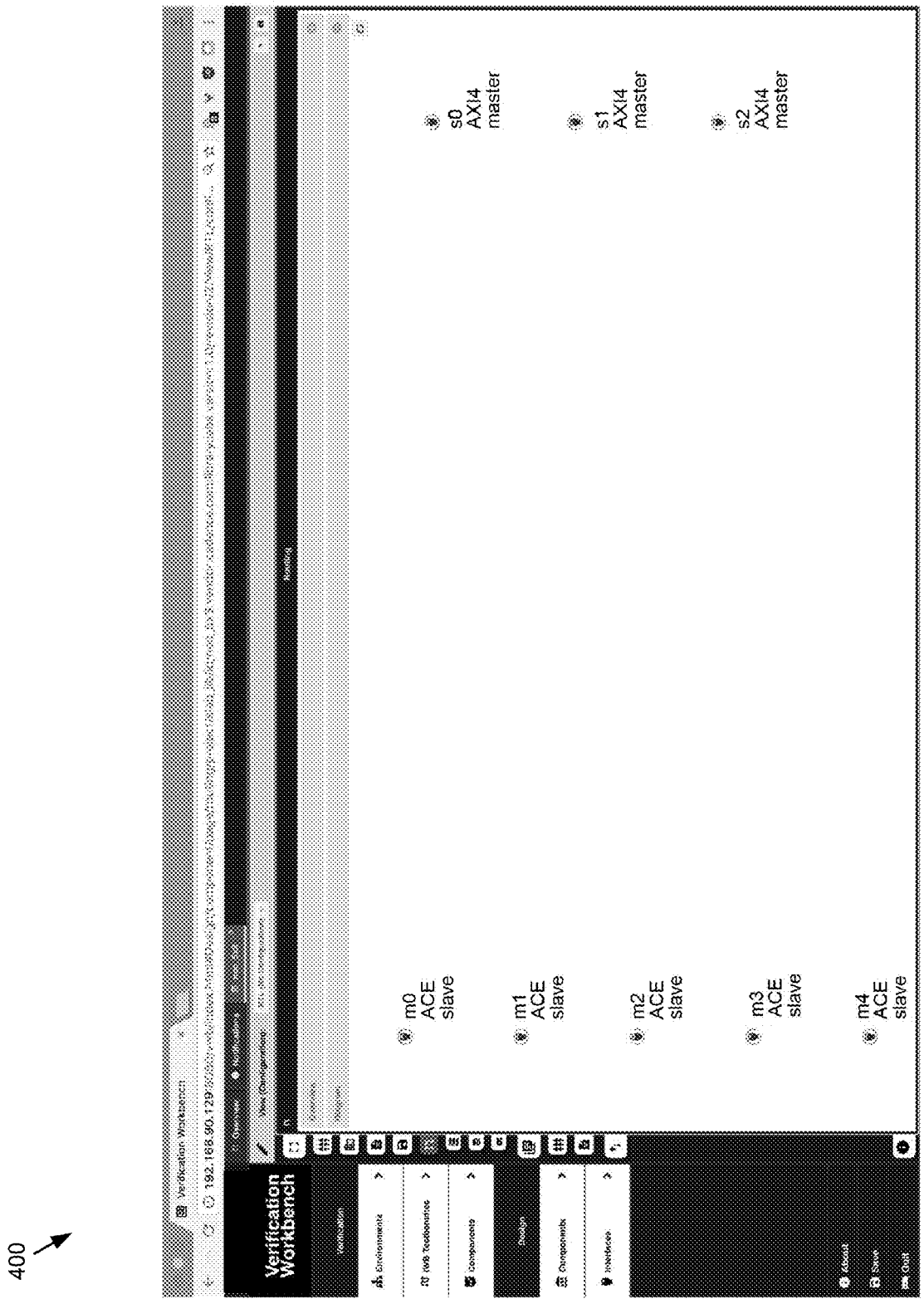
FIG. 4 is a diagram depicting a graphical user interface in accordance with an embodiment of the present disclosure.

Referring now to FIG. 4, a graphical user interface 400 is provided, which may be configured to implement one or more operations associated with display process 10. In this particular embodiment no routing data is shown. The ingress interfaces are located on the left side of GUI 400, the egress interfaces are located on the right side of GUI 500 and the data flow occurs from left to right on the display.

Figure 5:
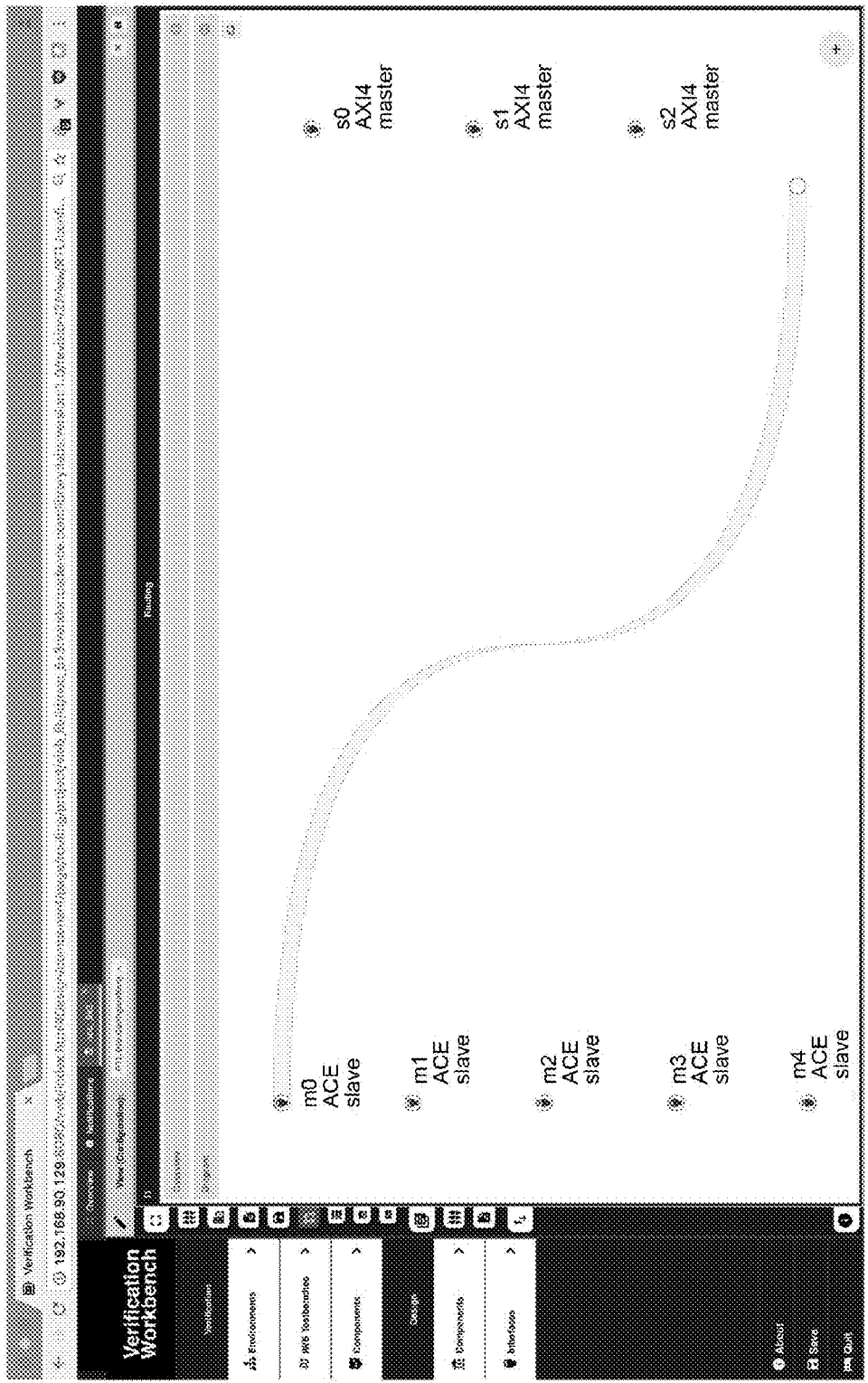
FIG. 5 is a diagram depicting a graphical user interface in accordance with an embodiment of the present disclosure.

Referring now to FIG. 5, a graphical user interface 500 is provided, which may be configured to implement one or more operations associated with display process 10. In this particular embodiment a user may drag an ingress interface into an "active area" in order to create memory space.

Figure 6:
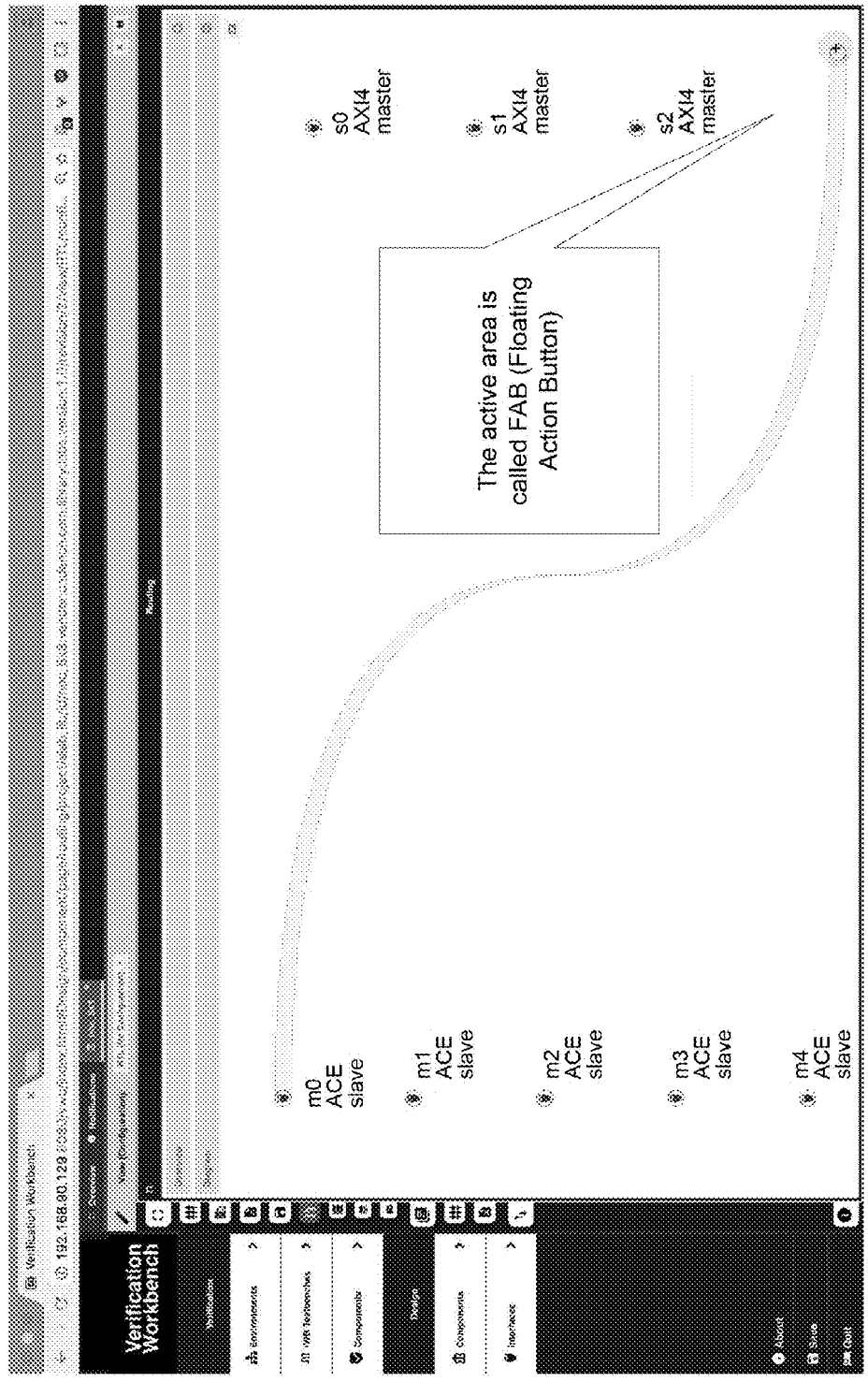
FIG. 6 is a diagram depicting a graphical user interface in accordance with an embodiment of the present disclosure.

Referring now to FIG. 6, a graphical user interface 600 is provided, which may be configured to implement one or more operations associated with display process 10. In this particular embodiment the active area may appear in context and may change in color to indicate possible action from red to green, for example. In this particular embodiment the active area may be referred to as a floating action button ("FAB").

Figure 7:
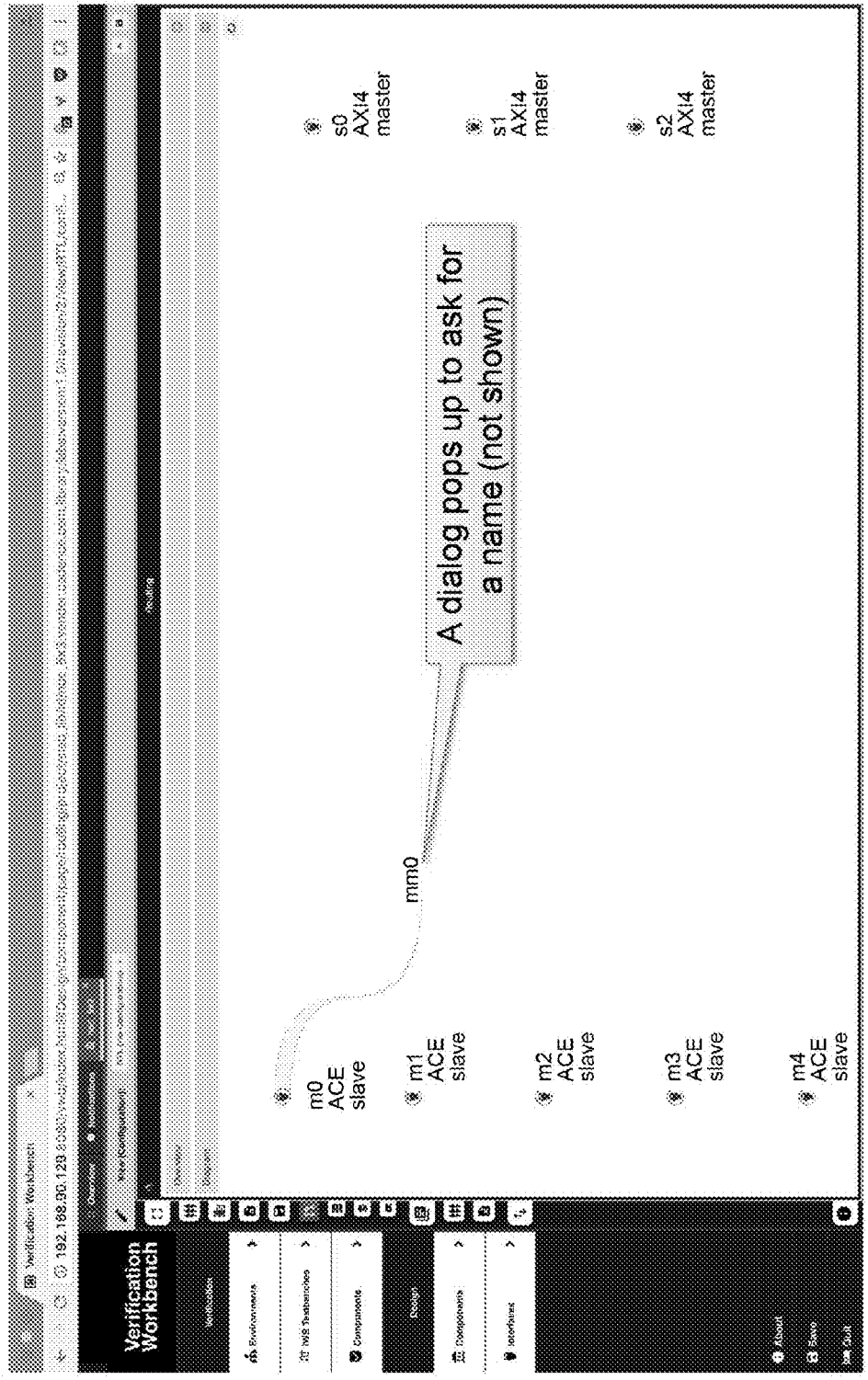
FIG. 7 is a diagram depicting a graphical user interface in accordance with an embodiment of the present disclosure.

Referring now to FIG. 7, a graphical user interface 700 is provided, which may be configured to implement one or more operations associated with display process 10. In this particular embodiment an empty memory space may be created, for example, size 0 until something is addressed. As shown in the Figure, a dialog may be presented to ask for a name.

Figure 8:
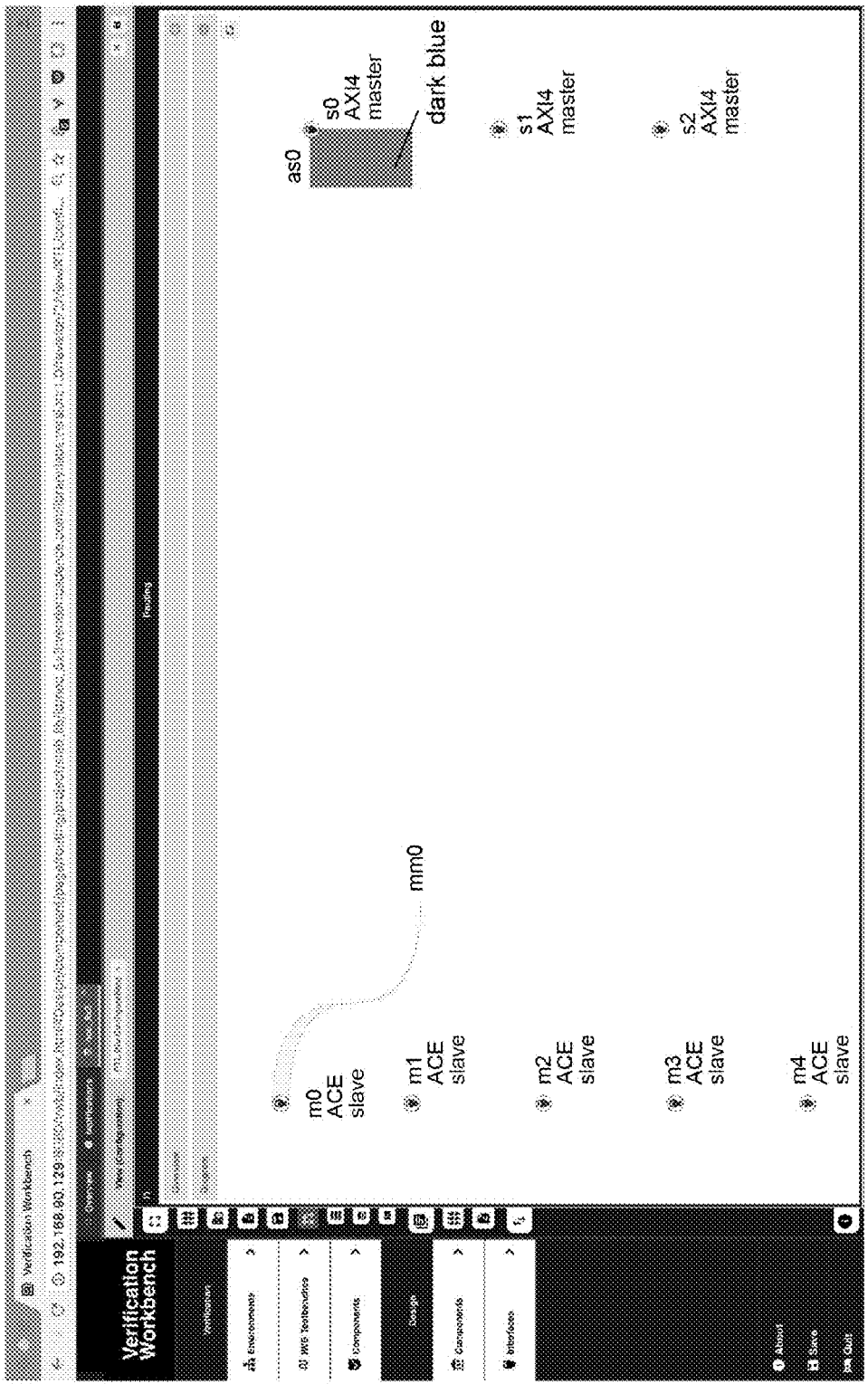
FIG. 8 is a diagram depicting a graphical user interface in accordance with an embodiment of the present disclosure.

Referring now to FIG. 8, a graphical user interface 800 is provided, which may be configured to implement one or more operations associated with display process 10. In this particular embodiment by dragging an egress interface to the FAB an address space may be created.

Figure 9:
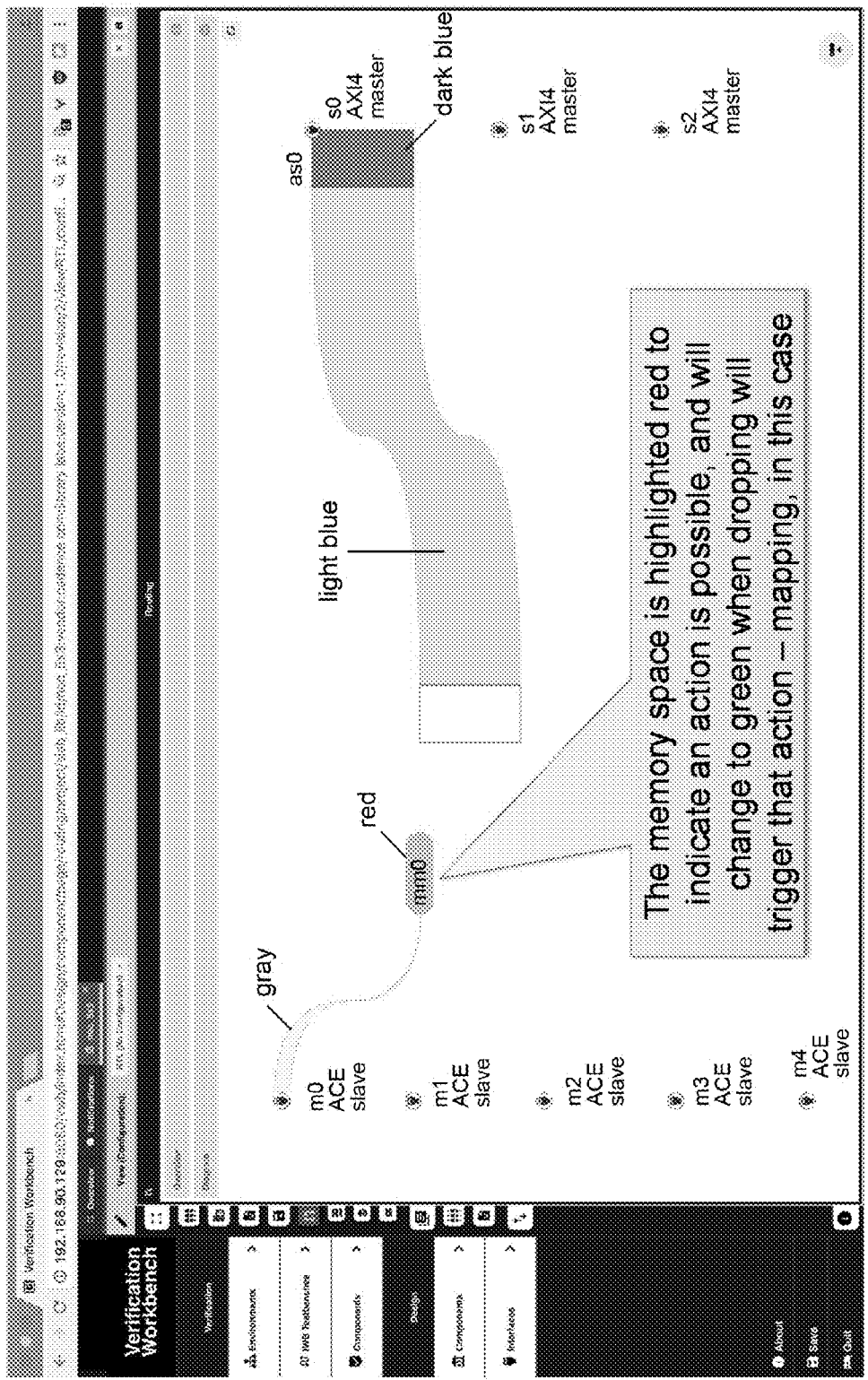
FIG. 9 is a diagram depicting a graphical user interface in accordance with an embodiment of the present disclosure.

Referring now to FIG. 9, a graphical user interface 900 is provided, which may be configured to implement one or more operations associated with display process 10. In this particular embodiment an address space may be dragged to a memory space to be mapped. The memory space may be highlighted a particular color (e.g., red) to indicate an action is possible and may change to another color (e.g. green) when dropping may trigger that action (in this example, mapping).

Figure 10:
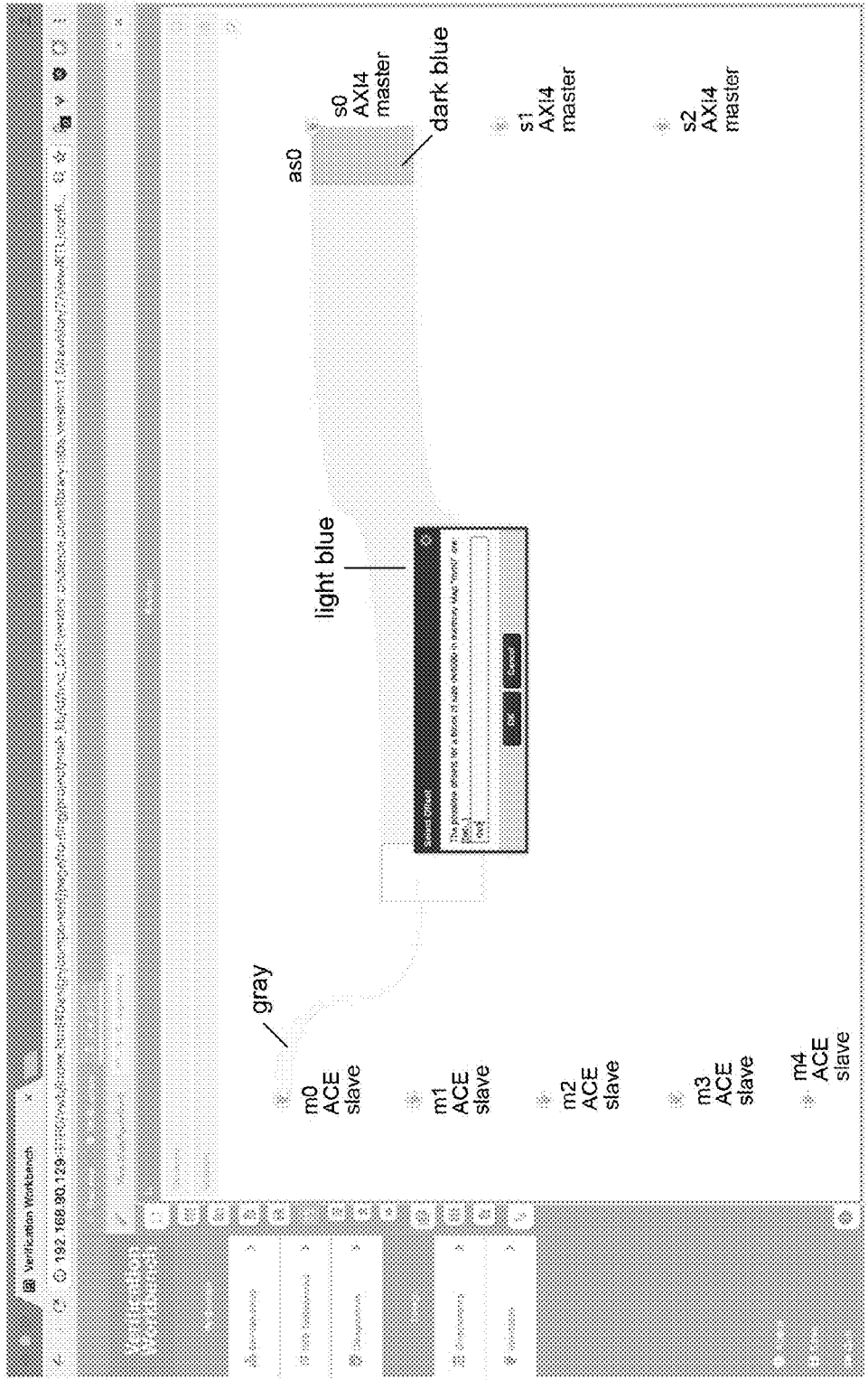
FIG. 10 is a diagram depicting a graphical user interface in accordance with an embodiment of the present disclosure.

Referring now to FIG. 10, a graphical user interface 1000 is provided, which may be configured to implement one or more operations associated with display process 10. In this particular embodiment display process 10 may allow a user to select an offset for mapping and the top unmapped address may be offered as a default as shown in the Figure.

Figure 11:
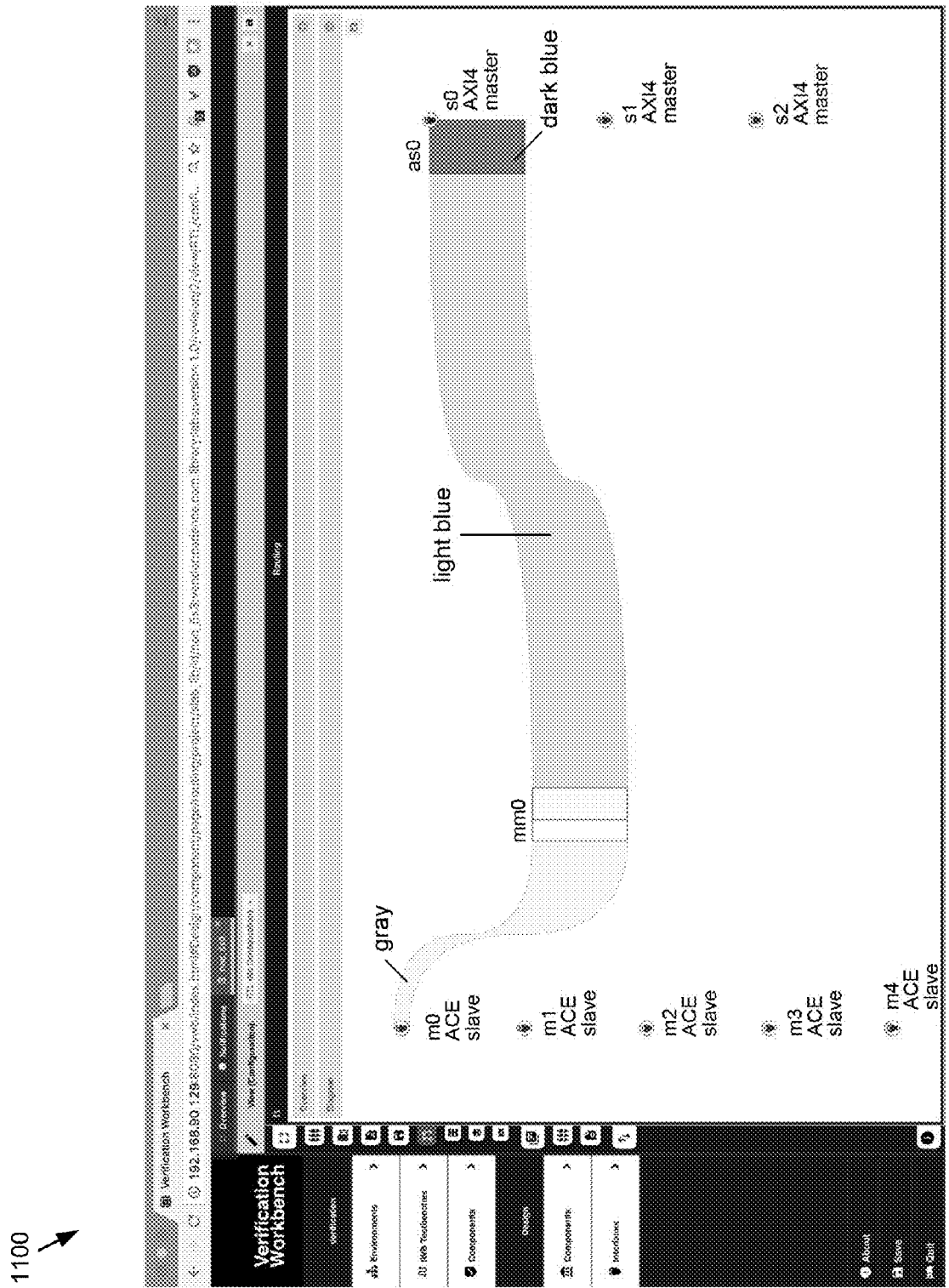
FIG. 11 is a diagram depicting a graphical user interface in accordance with an embodiment of the present disclosure.

Referring now to FIG. 11, a graphical user interface 1100 is provided, which may be configured to implement one or more operations associated with display process 10. In this particular embodiment the result from FIG. 10 may include a memory space fully mapped to one address space, correct by design.

Figure 12:
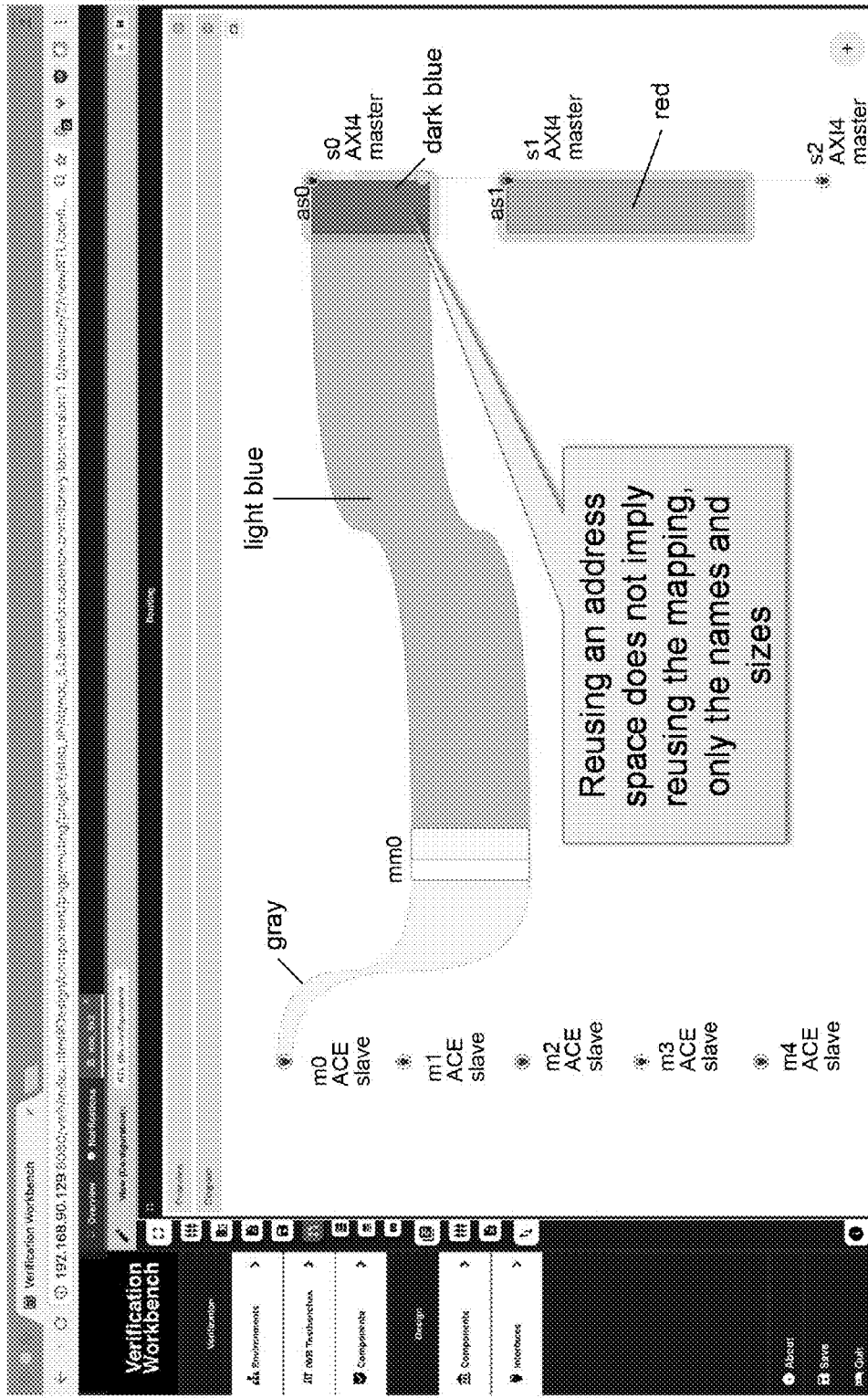
FIG. 12 is a diagram depicting a graphical user interface in accordance with an embodiment of the present disclosure.

Referring now to FIG. 12, a graphical user interface 1200 is provided, which may be configured to implement one or more operations associated with display process 10. In this particular embodiment an egress interface may be dragged to an existing address space to use the same address space. It should be noted that reusing an address space may not imply reusing the mapping, only the names and sizes.

Figure 13:
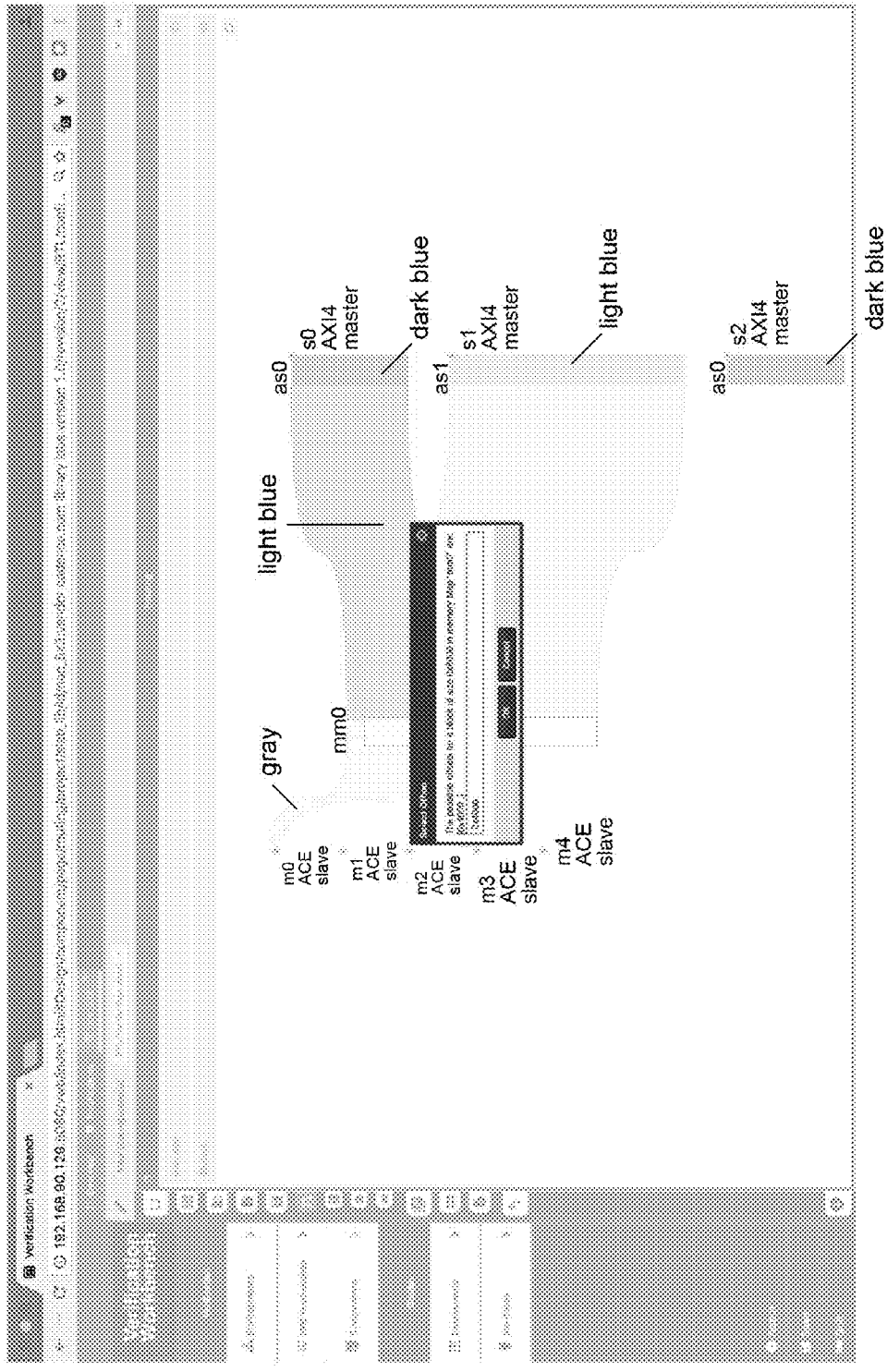
FIG. 13 is a diagram depicting a graphical user interface in accordance with an embodiment of the present disclosure.

Referring now to FIG. 13, a graphical user interface 1300 is provided, which may be configured to implement one or more operations associated with display process 10. In this particular embodiment mapping a second address space to the same memory map is provided. In this example a default offset may be included in the display.

Figure 14:
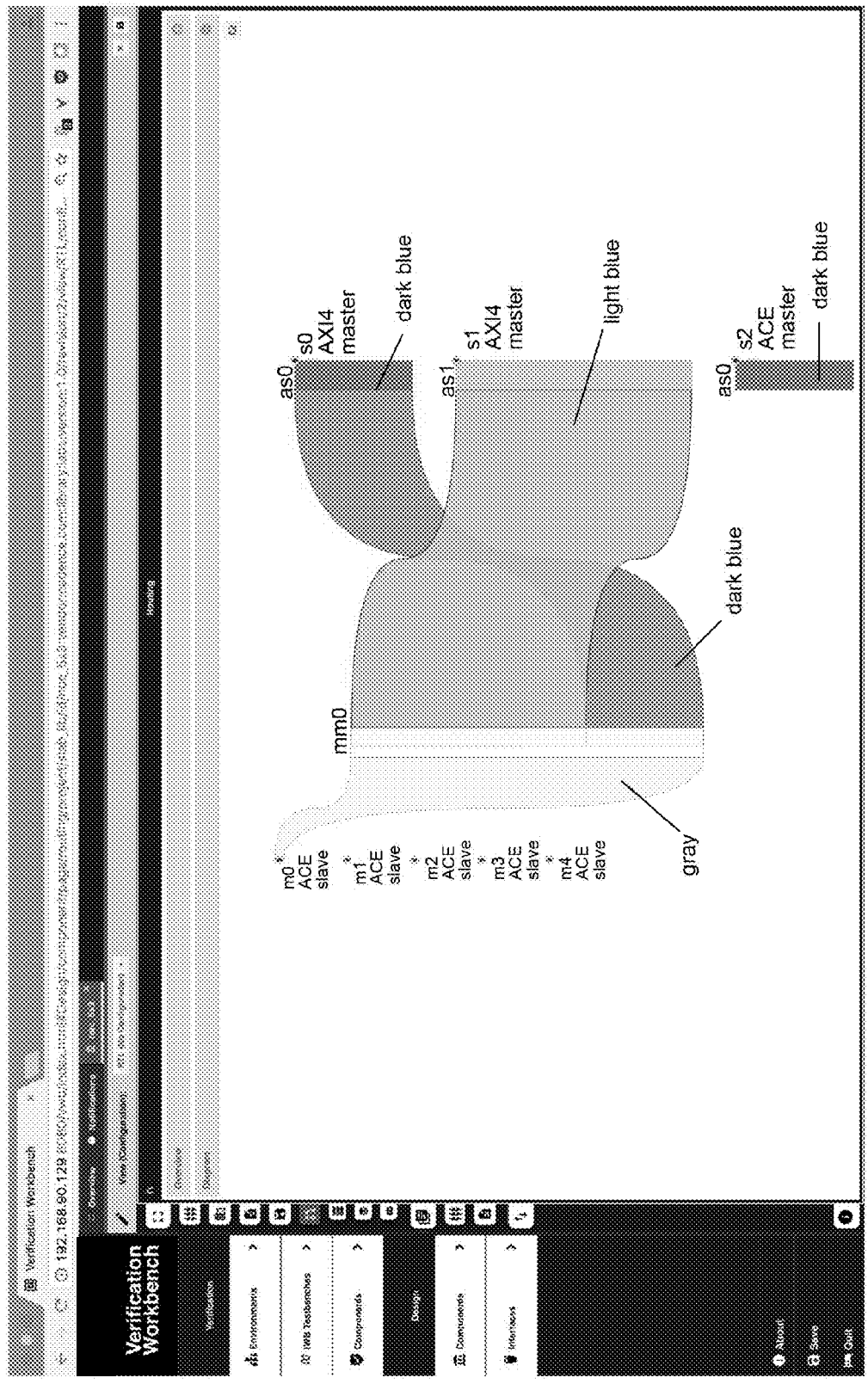
FIG. 14 is a diagram depicting a graphical user interface in accordance with an embodiment of the present disclosure.

Referring now to FIG. 14, a graphical user interface 1400 is provided, which may be configured to implement one or more operations associated with display process 10. In this particular embodiment the result of the second mapping is shown. Here, the second address space is mapped about the first address space.

Figure 15:
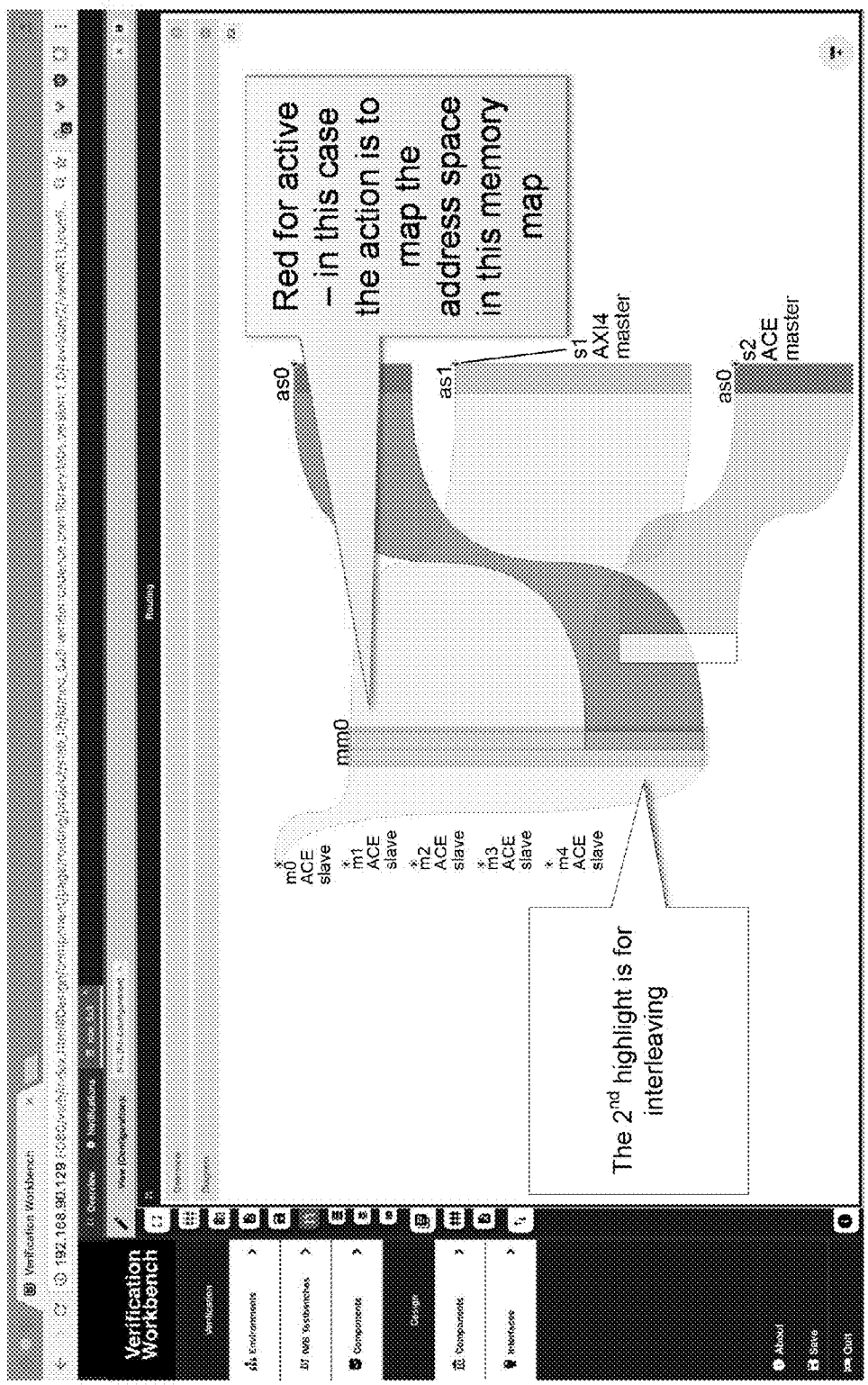
FIG. 15 is a diagram depicting a graphical user interface in accordance with an embodiment of the present disclosure.

Referring now to FIG. 15, a graphical user interface 1500 is provided, which may be configured to implement one or more operations associated with display process 10. In this particular embodiment the mapping of a third address space is shown. As shown in the figure, a red color is used for active, for example, in this case, the action is to map the address space in this memory map. The second highlight may be used for interleaving as is discussed in further detail hereinbelow.

Figure 16:
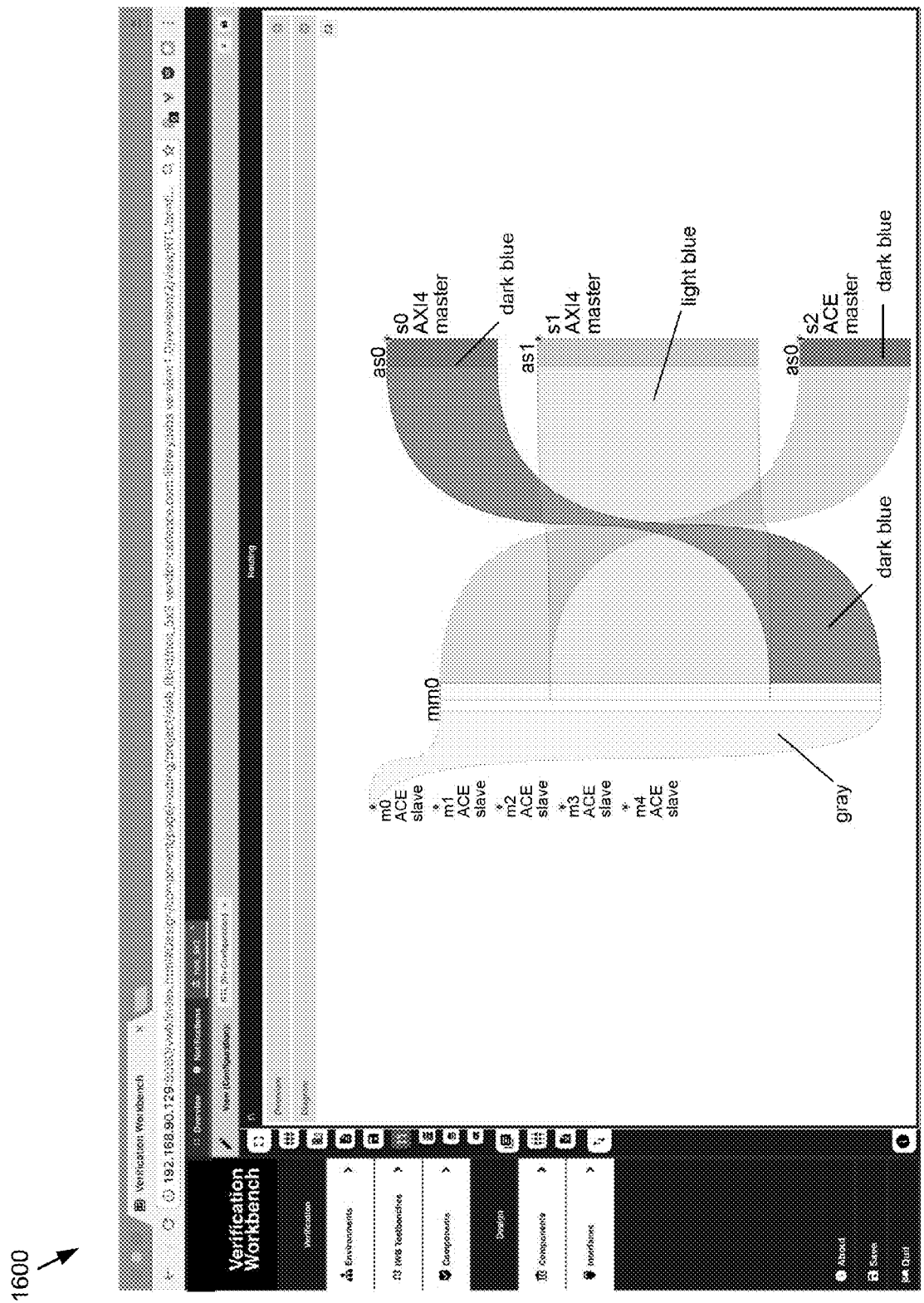
FIG. 16 is a diagram depicting a graphical user interface in accordance with an embodiment of the present disclosure.

Referring now to FIG. 16, a graphical user interface 1600 is provided, which may be configured to implement one or more operations associated with display process 10. In this particular embodiment the result of mapping the third address space is shown.

Figure 17:
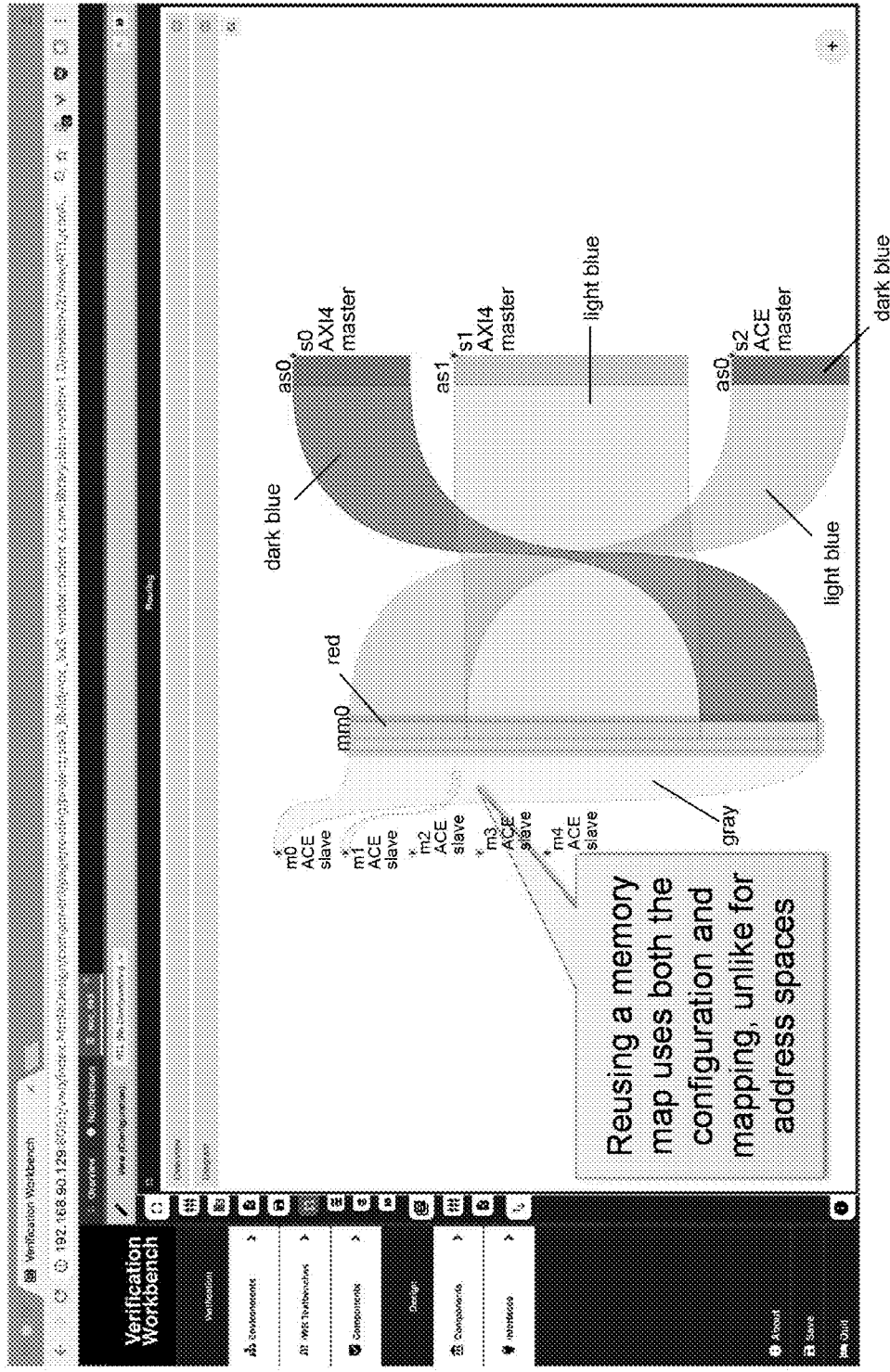
FIG. 17 is a diagram depicting a graphical user interface in accordance with an embodiment of the present disclosure.

Referring now to FIG. 17, a graphical user interface 1700 is provided, which may be configured to implement one or more operations associated with display process 10. In this particular embodiment an ingress interface may be mapped by the same memory map using any suitable approach. For example, by dragging to it, etc. Reusing a memory map may use both the configuration and mapping, unlike address spaces.

Figure 18:
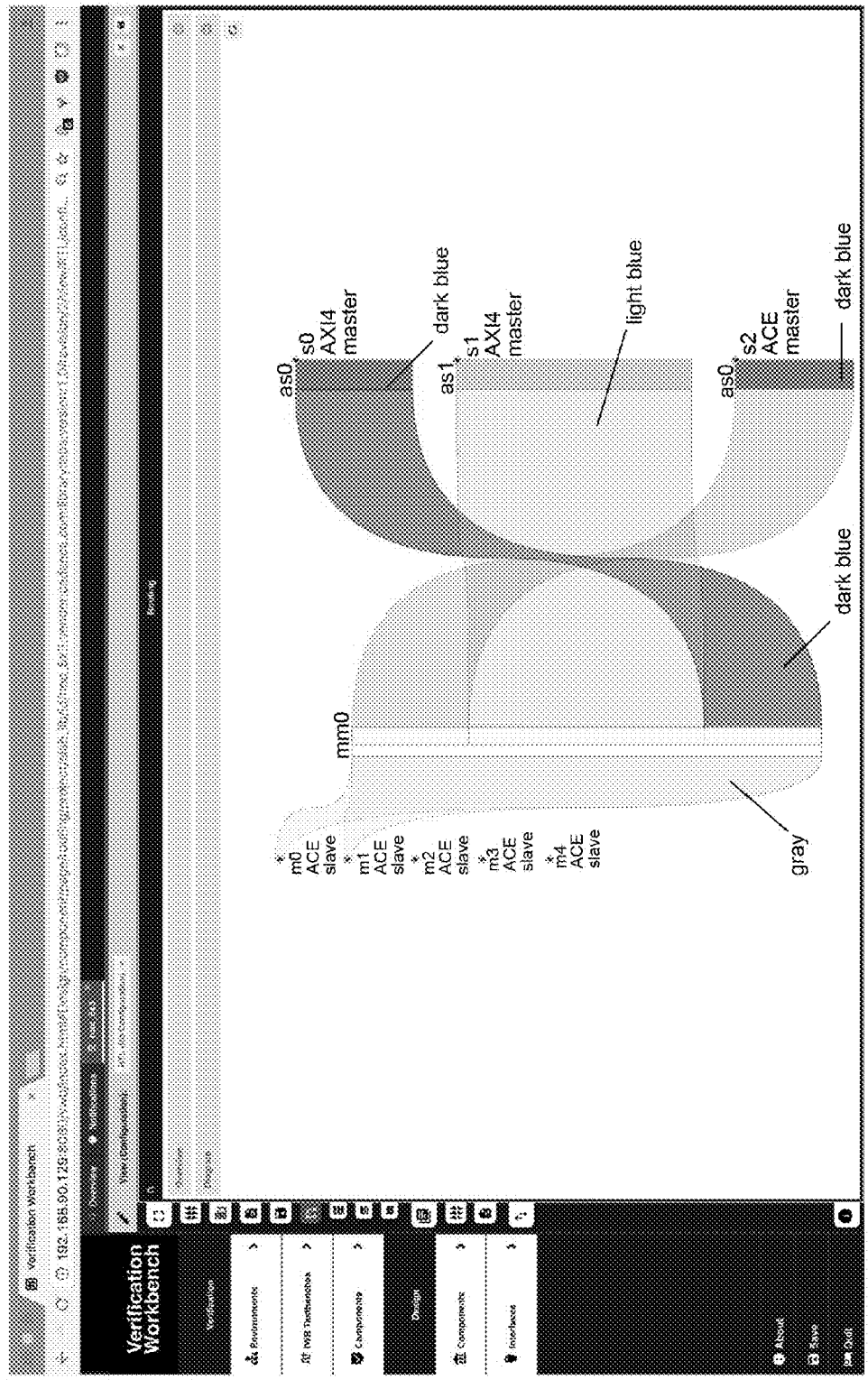
FIG. 18 is a diagram depicting a graphical user interface in accordance with an embodiment of the present disclosure.

Referring now to FIG. 18, a graphical user interface 1800 is provided, which may be configured to implement one or more operations associated with display process 10. In this particular embodiment the second ingress interface may be mapped using the same memory map.

Figure 19:
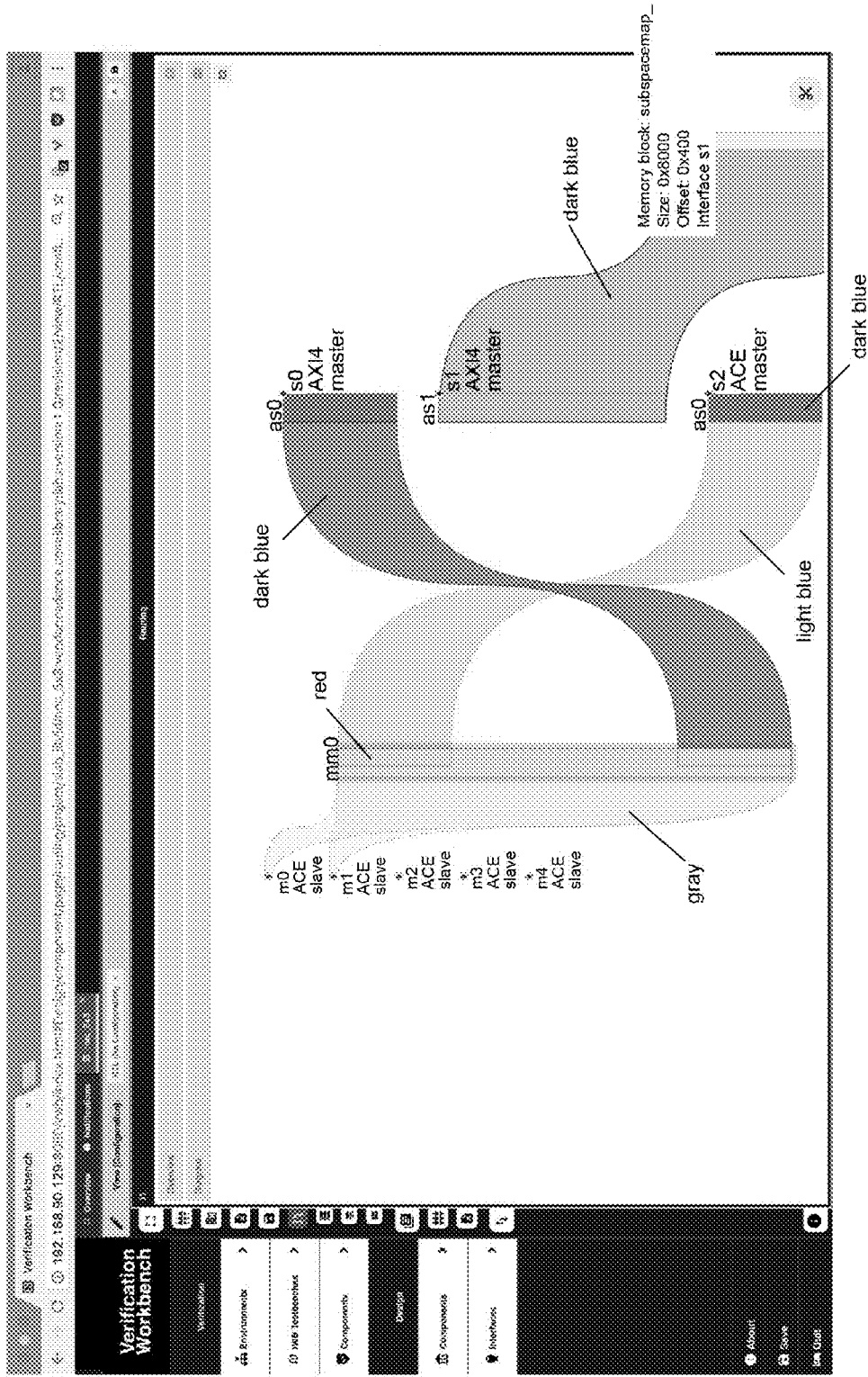
FIG. 19 is a diagram depicting a graphical user interface in accordance with an embodiment of the present disclosure.

Referring now to FIG. 19, a graphical user interface 1900 is provided, which may be configured to implement one or more operations associated with display process 10. In this particular embodiment unmapping may be performed using a drag and drop technique or any other suitable approach. In this example, the FAB may be aware of the context.

Figure 20:
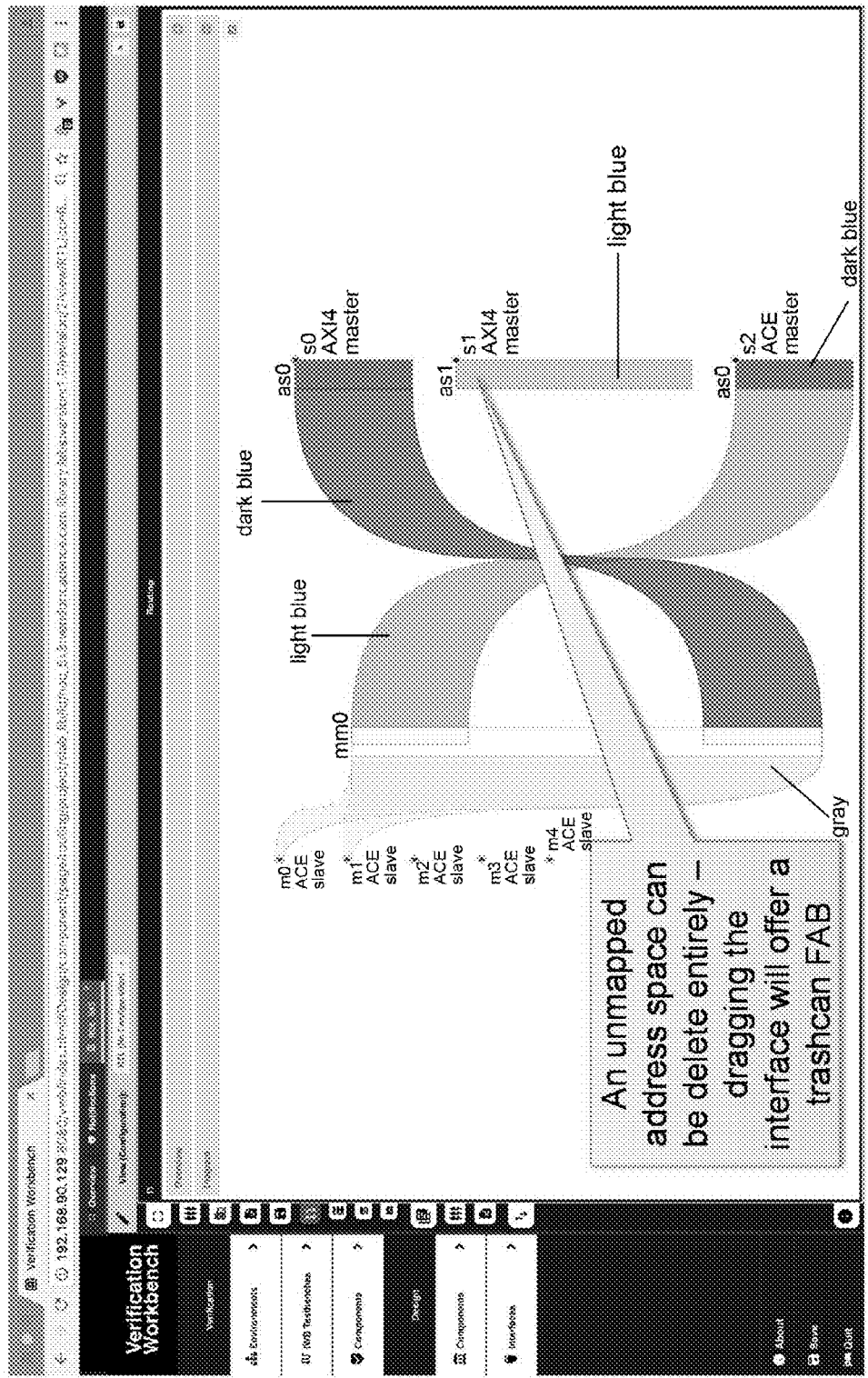
FIG. 20 is a diagram depicting a graphical user interface in accordance with an embodiment of the present disclosure.

Referring now to FIG. 20 a graphical user interface 2000 is provided, which may be configured to implement one or more operations associated with display process 10. In this particular embodiment the second address space may be unmapped. In some embodiments, an unmapped address space may be deleted entirely. Accordingly, dragging the interface may provide a trashcan FAB.

Figure 21:
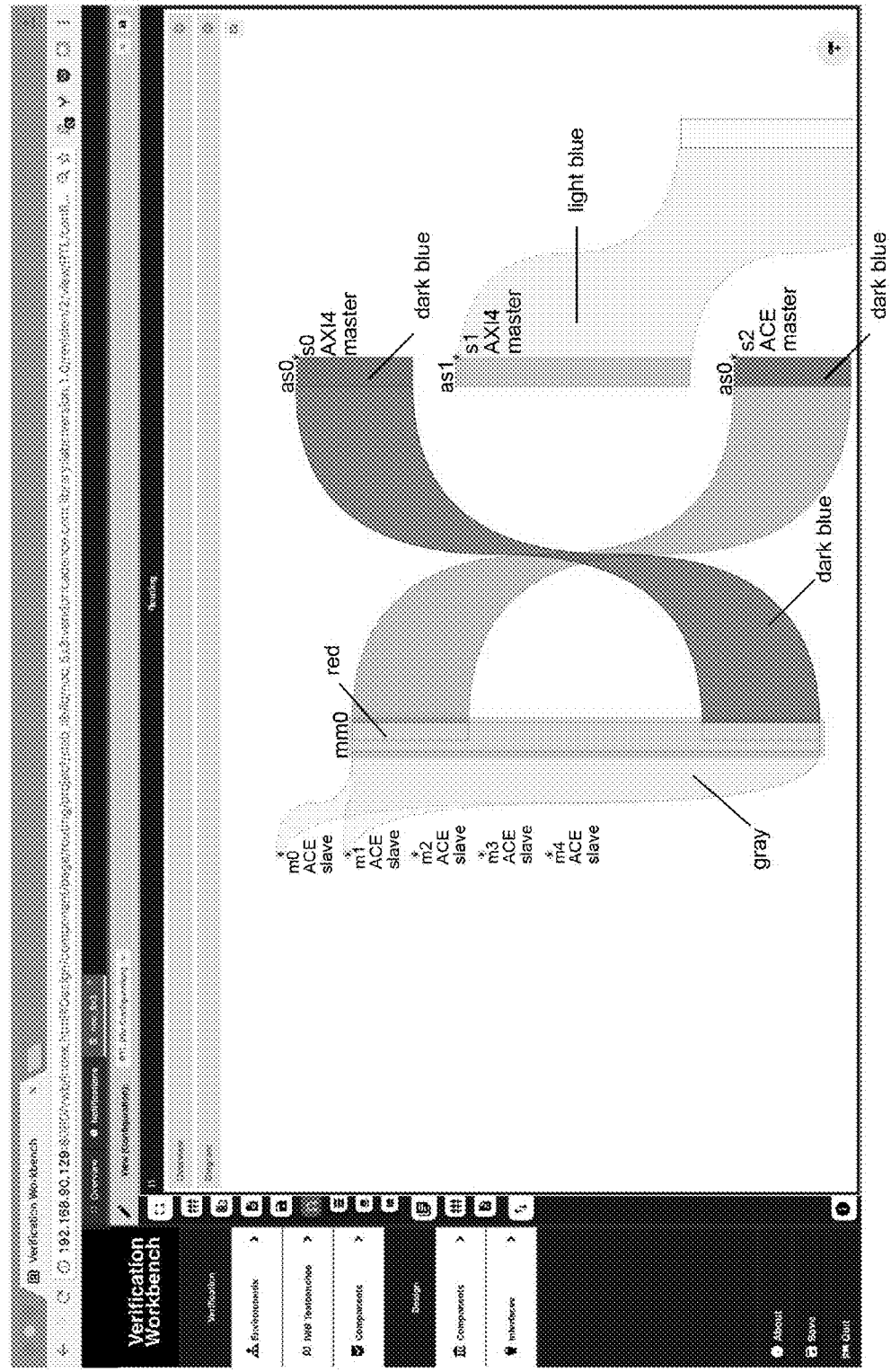
FIG. 21 is a diagram depicting a graphical user interface in accordance with an embodiment of the present disclosure.

Referring now to FIG. 21, a graphical user interface 2100 is provided, which may be configured to implement one or more operations associated with display process 10. In this particular embodiment dragging an address space may offer an FAB for creating segments.

Figure 22:
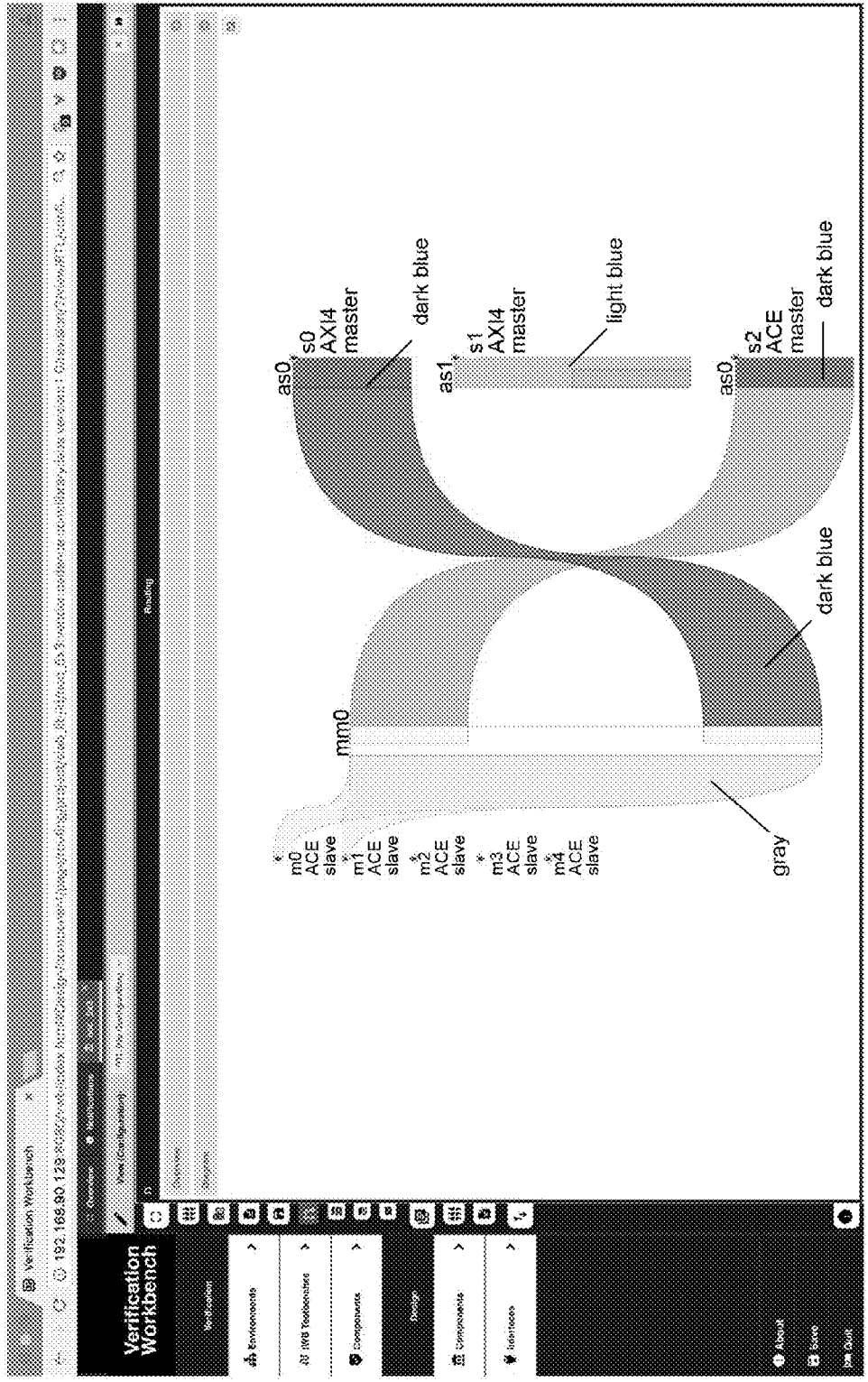
FIG. 22 is a diagram depicting a graphical user interface in accordance with an embodiment of the present disclosure.

Referring now to FIG. 22, a graphical user interface 800 is provided, which may be configured to implement one or more operations associated with display process 10. In this particular embodiment a segment may be created for the lower half of the address space.

Figure 23:
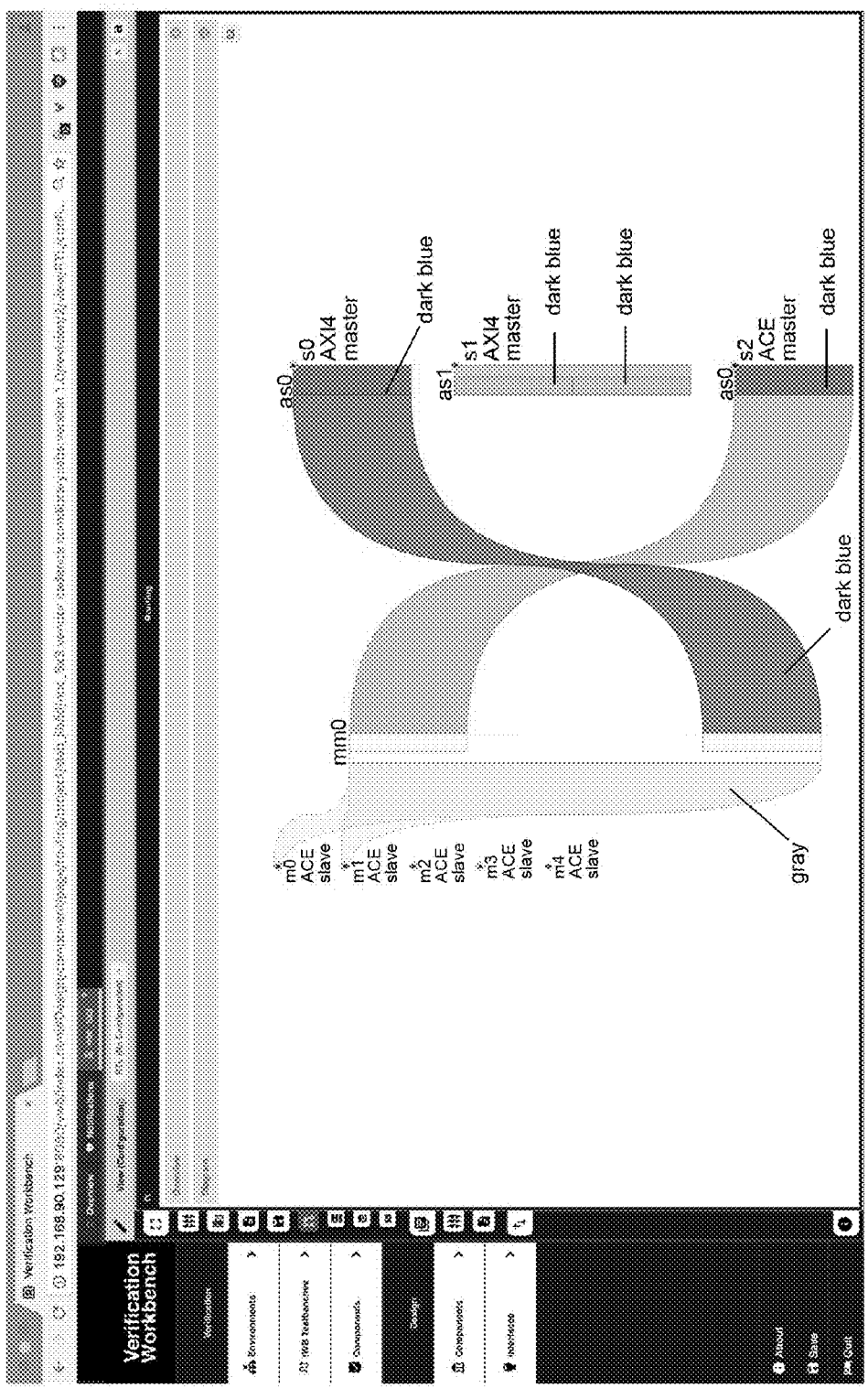
FIG. 23 is a diagram depicting a graphical user interface in accordance with an embodiment of the present disclosure.

Referring now to FIG. 23, a graphical user interface 2300 is provided, which may be configured to implement one or more operations associated with display process 10. In this particular embodiment a second segment may be created for the upper half.

Figure 24:
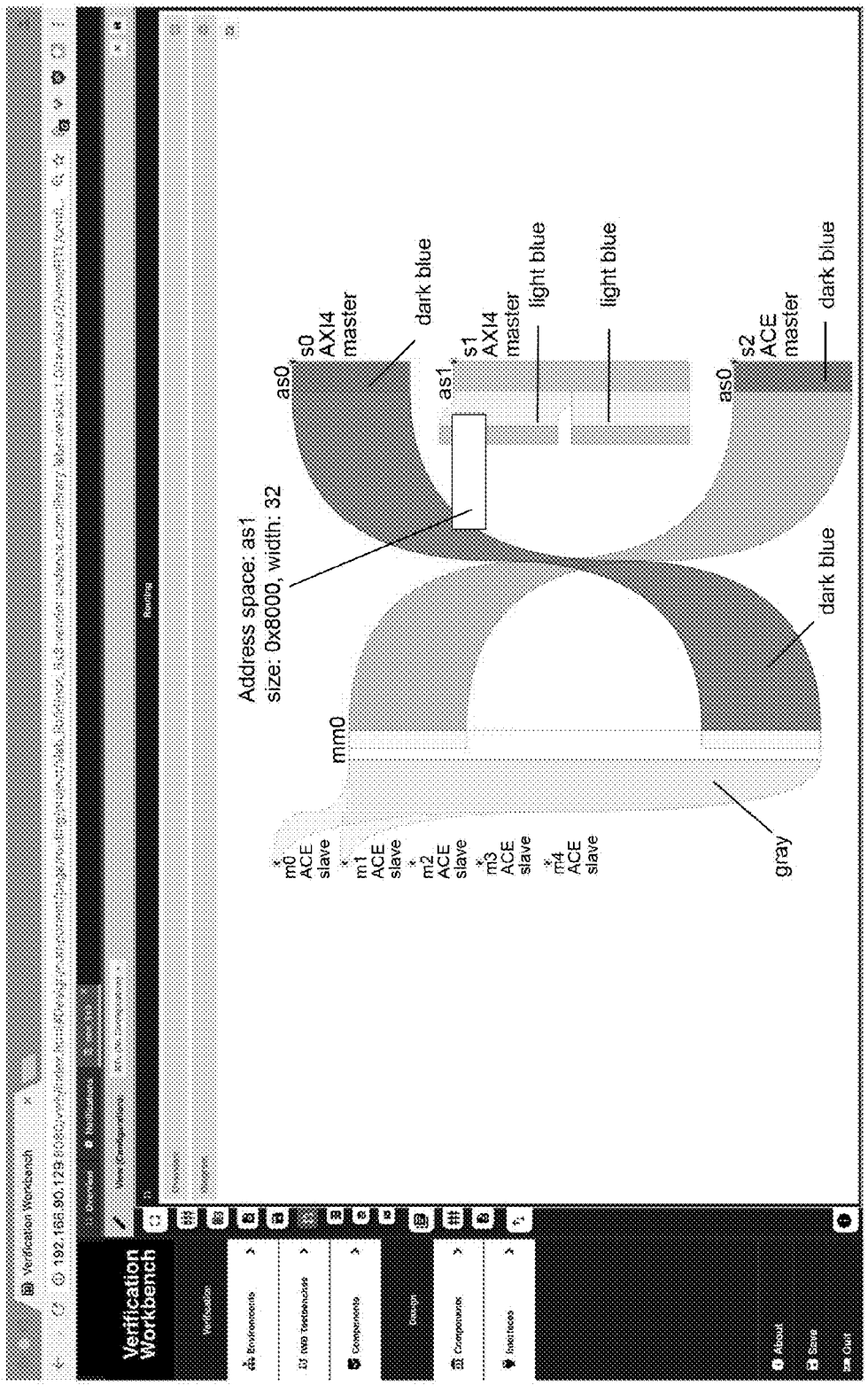
FIG. 24 is a diagram depicting a graphical user interface in accordance with an embodiment of the present disclosure.

Referring now to FIG. 24, a graphical user interface 2400 is provided, which may be configured to implement one or more operations associated with display process 10. In this particular embodiment segments may overlap. For example, hovering the mouse may expand one or more segments to a non-overlapping view.

Figure 25:
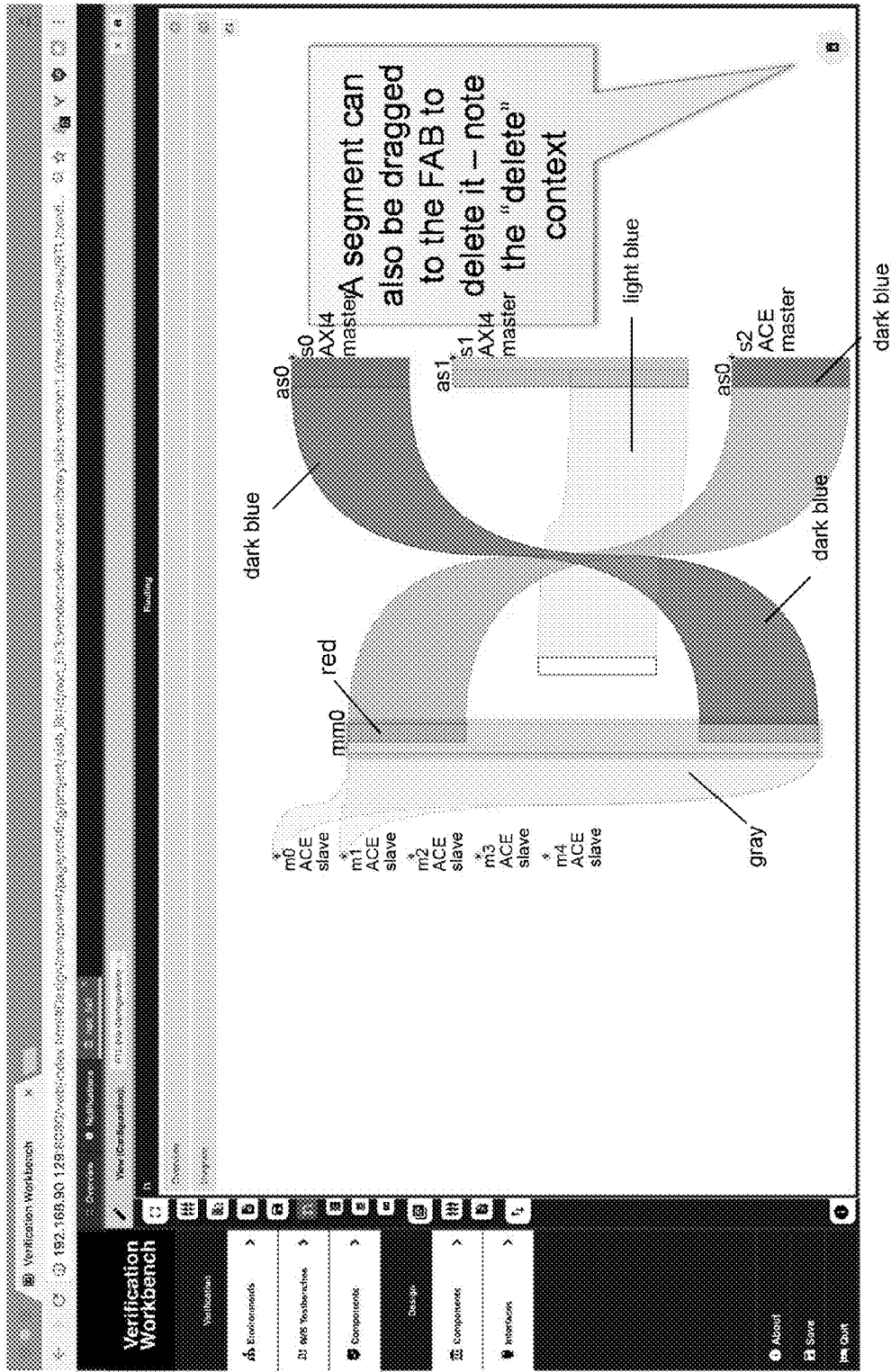
FIG. 25 is a diagram depicting a graphical user interface in accordance with an embodiment of the present disclosure.

Referring now to FIG. 25, a graphical user interface 2500 is provided, which may be configured to implement one or more operations associated with display process 10. In this particular embodiment segments may be mapped in the same way as address spaces. In this particular embodiment, a segment may be dragged to the FAB to delete it. Note the delete context.

Figure 26:
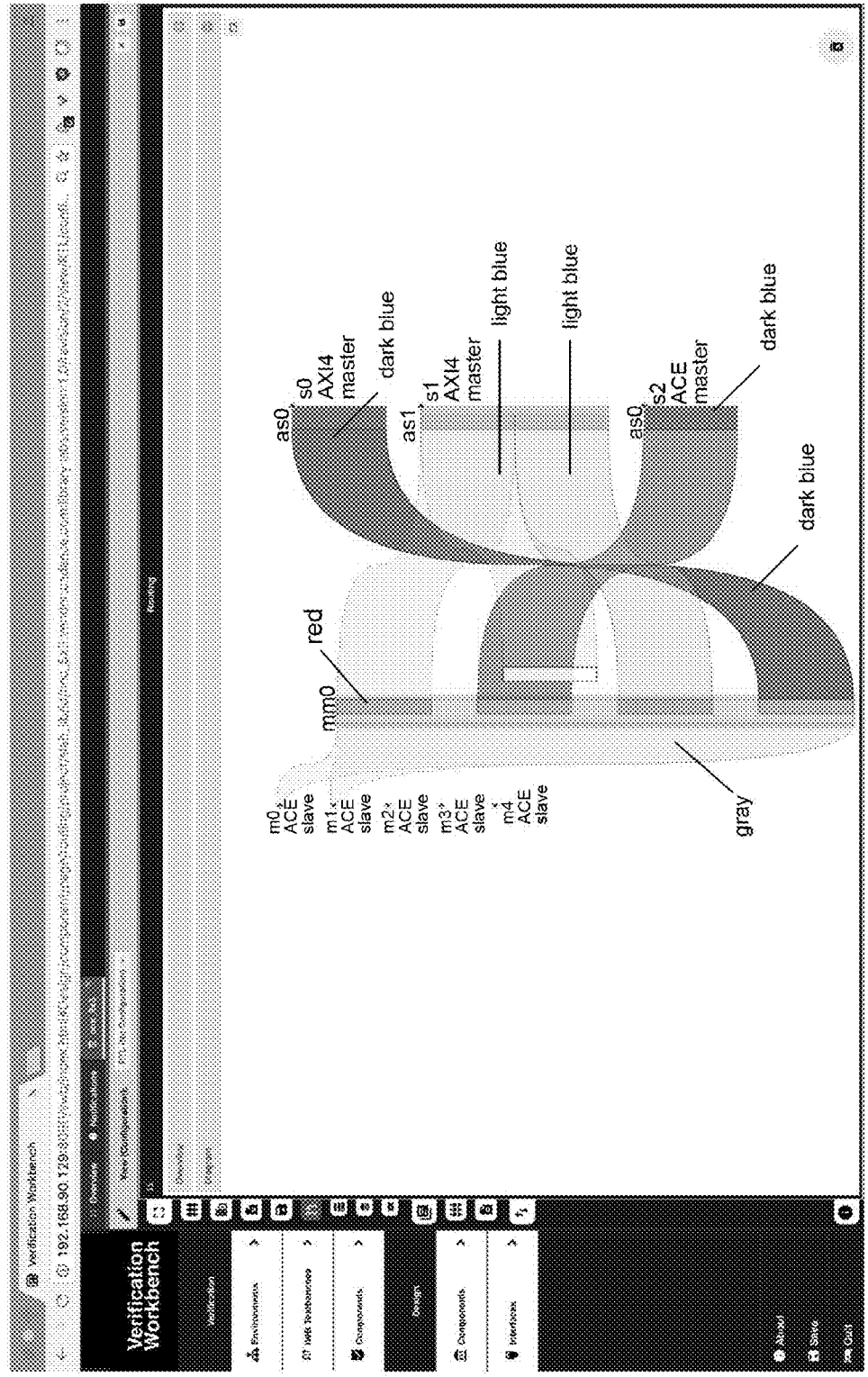
FIG. 26 is a diagram depicting a graphical user interface in accordance with an embodiment of the present disclosure.

Referring now to FIG. 26, a graphical user interface 2600 is provided, which may be configured to implement one or more operations associated with display process 10. In this particular embodiment dragging an address space or segment may also highlight any memory blocks of the same size.

Figure 27:
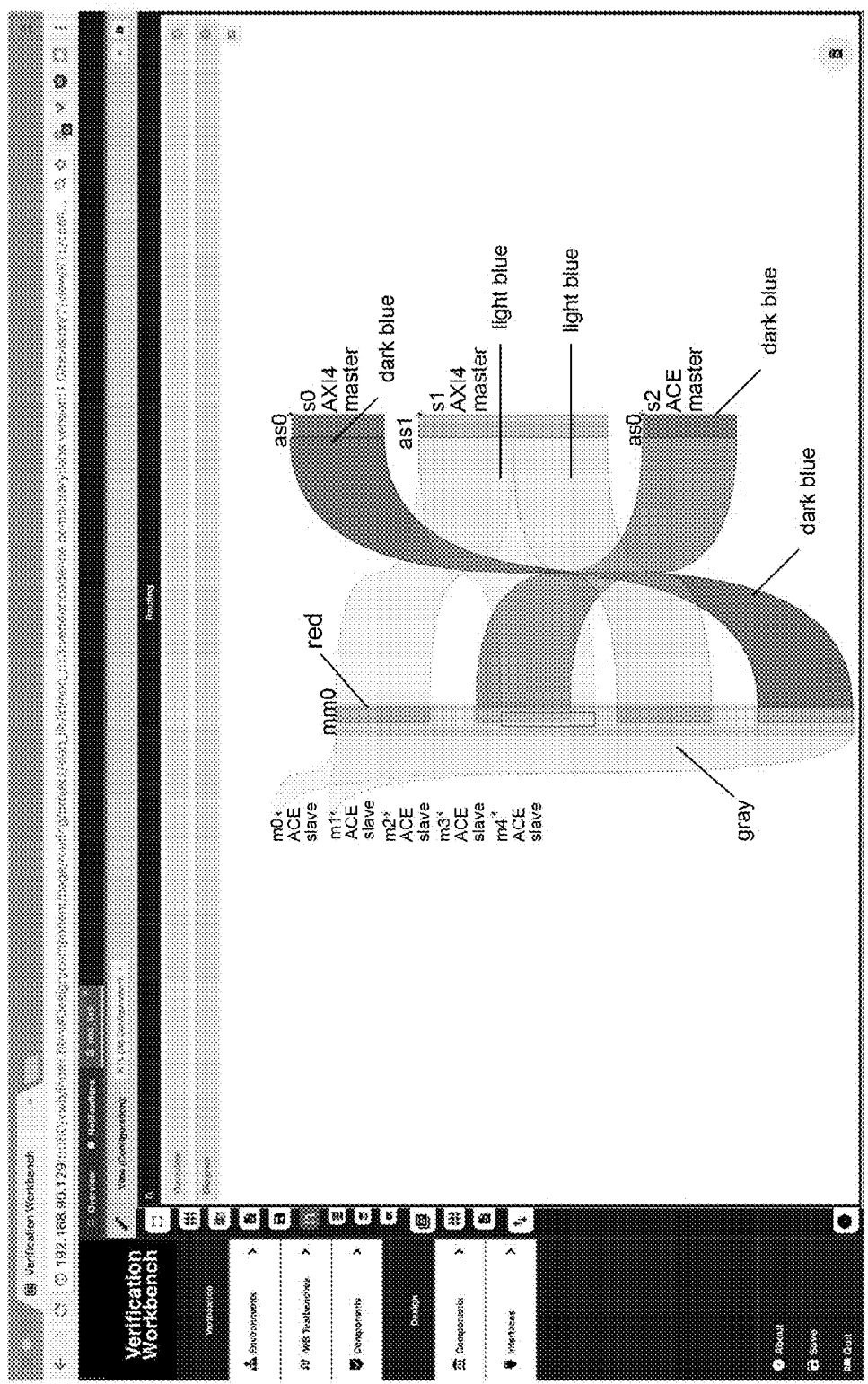
FIG. 27 is a diagram depicting a graphical user interface in accordance with an embodiment of the present disclosure.

Referring now to FIG. 27, a graphical user interface 2700 is provided, which may be configured to implement one or more operations associated with display process 10. In this particular embodiment dropping on such blocks may create an interleaved block.

Figure 28:
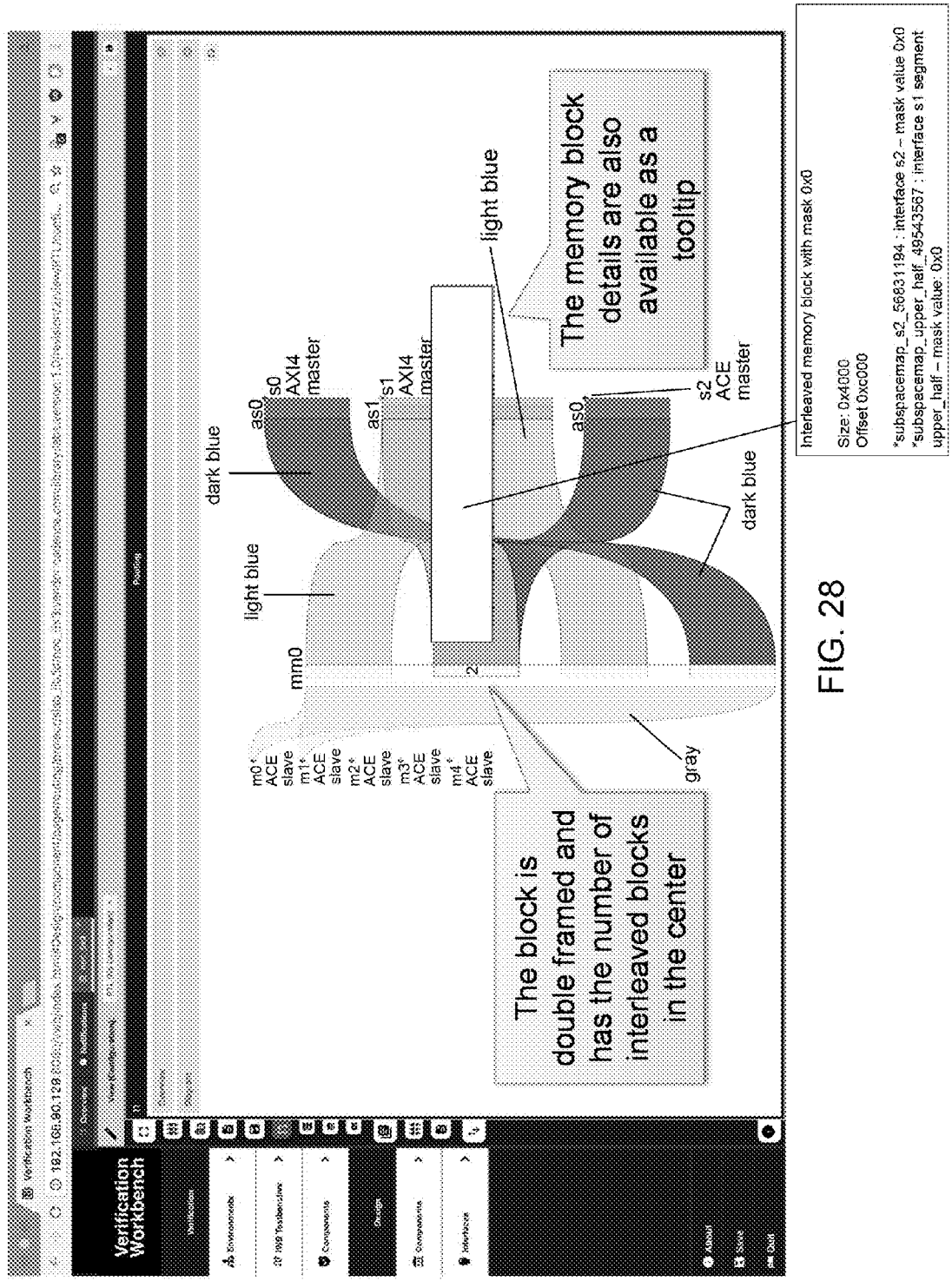
FIG. 28 is a diagram depicting a graphical user interface in accordance with an embodiment of the present disclosure.

Referring now to FIG. 28, a graphical user interface 2800 is provided, which may be configured to implement one or more operations associated with display process 10. In this particular embodiment an interleaved block may be created. As shown in the Figure the block may be double framed and may include the number of interleaved blocks in the center. The memory block details may also be made available (e.g. as a tooltip, etc.).

Figure 29:
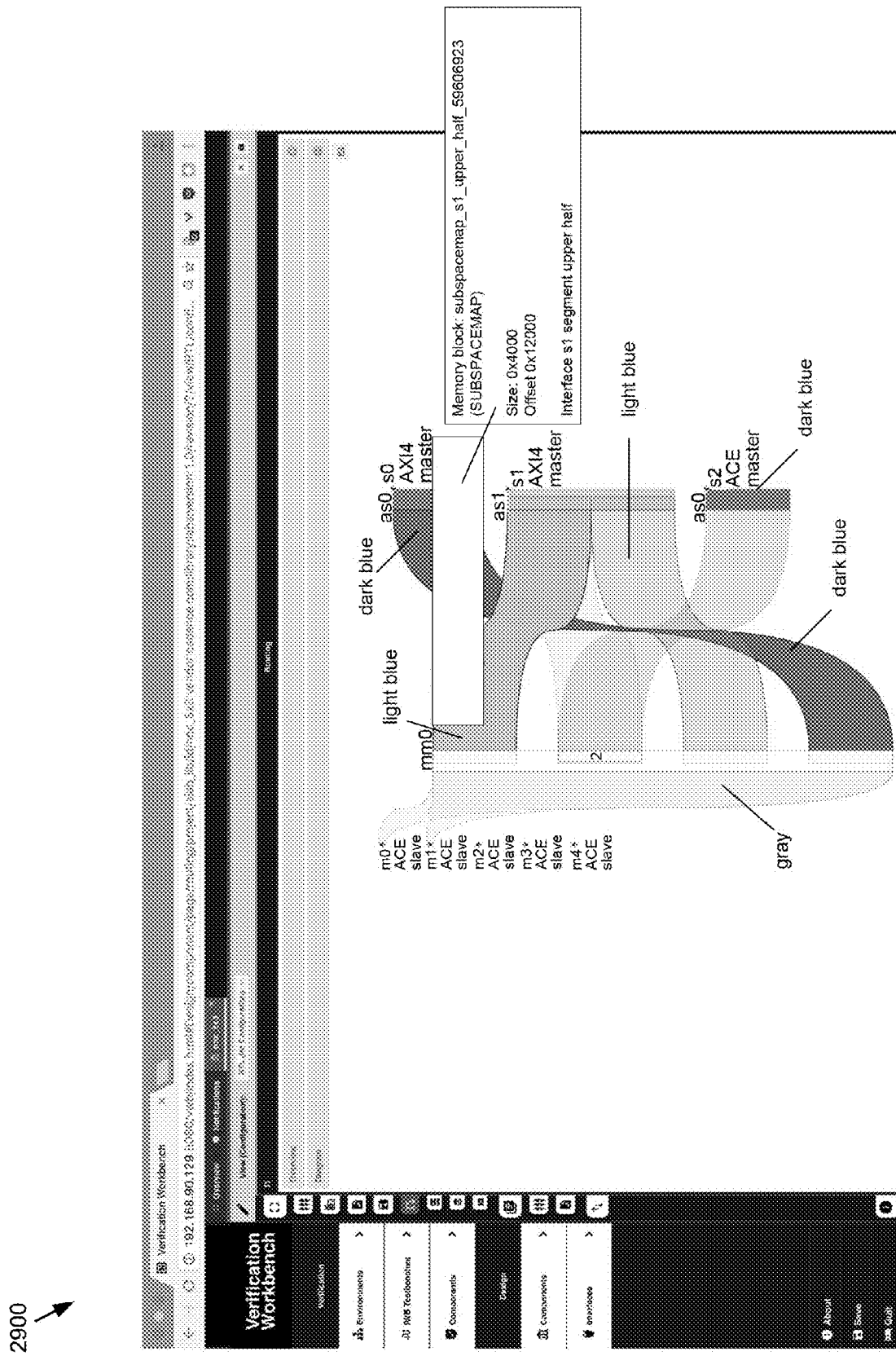
FIG. 29 is a diagram depicting a graphical user interface in accordance with an embodiment of the present disclosure.

Referring now to FIG. 29, a graphical user interface 2900 is provided, which may be configured to implement one or more operations associated with display process 10. In this particular embodiment tooltips may be available for all entities, in this example, for a memory block.

Figure 30:
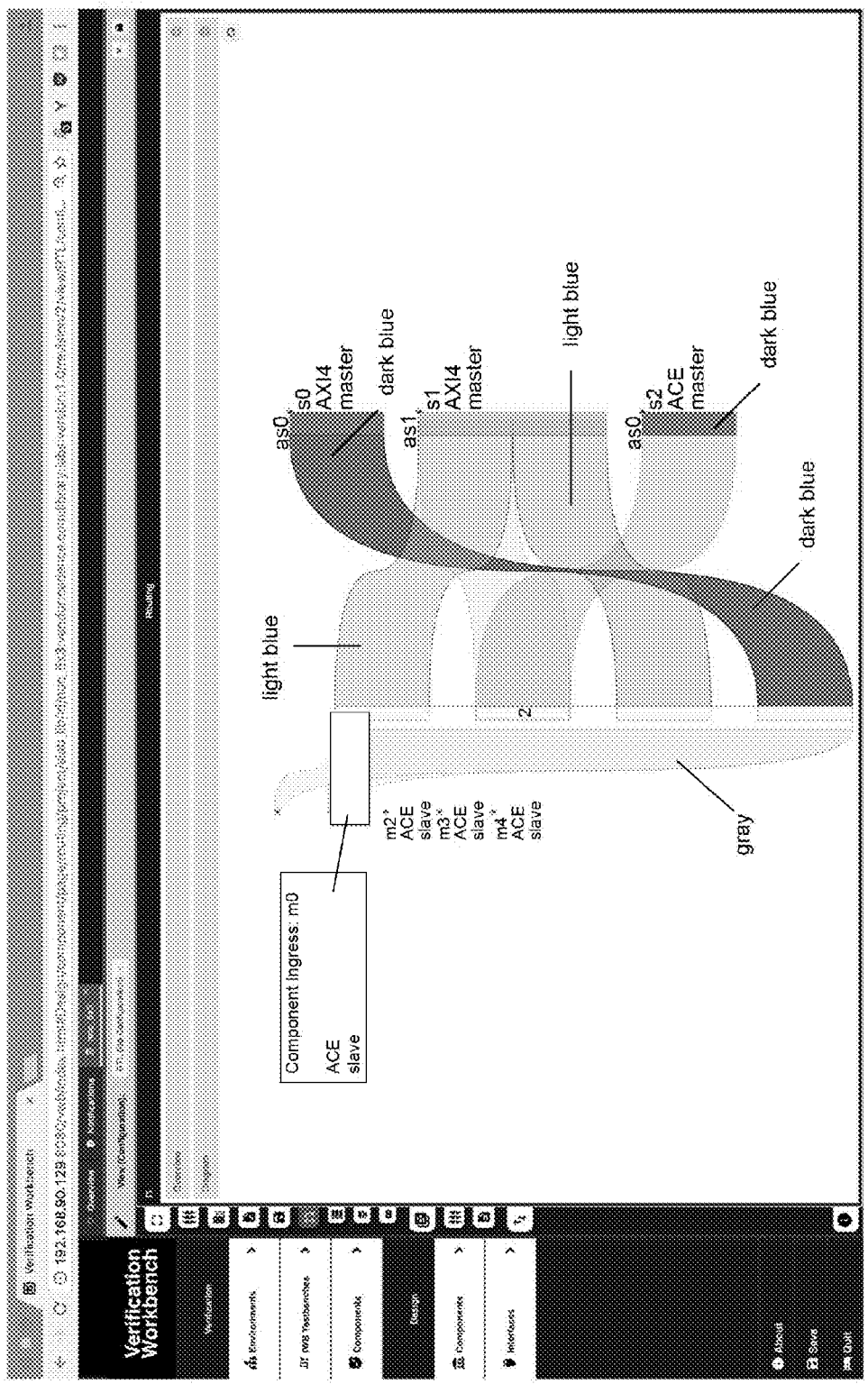
FIG. 30 is a diagram depicting a graphical user interface in accordance with an embodiment of the present disclosure.

Referring now to FIG. 30, a graphical user interface 3000 is provided, which may be configured to implement one or more operations associated with display process 10. In this particular embodiment an example tooltip for an ingress interface is provided.

Figure 31:
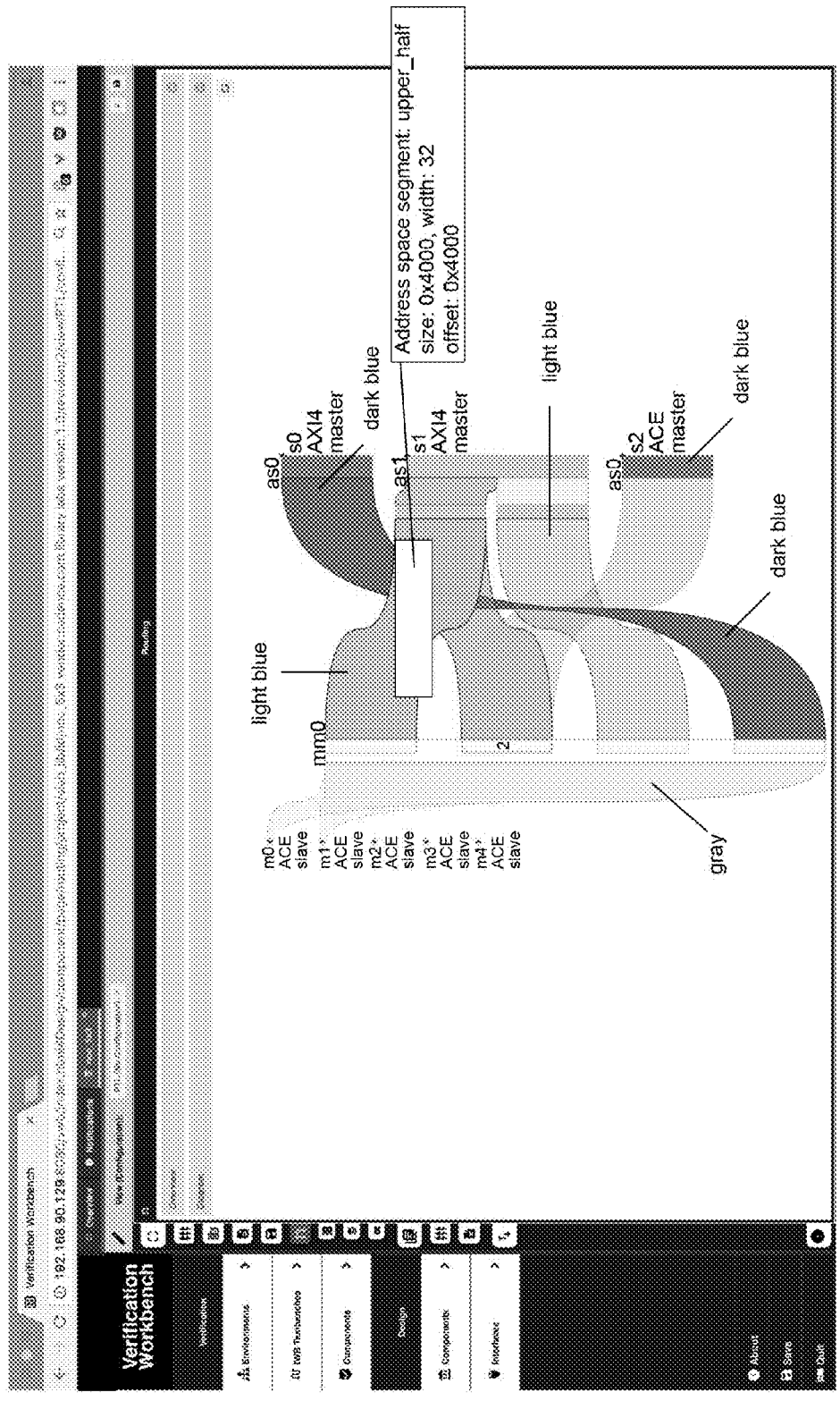
FIG. 31 is a diagram depicting a graphical user interface in accordance with an embodiment of the present disclosure.

Referring now to FIG. 31, a graphical user interface 3100 is provided, which may be configured to implement one or more operations associated with display process 10. In this particular embodiment a tooltip for a segment is shown.

Figure 32:
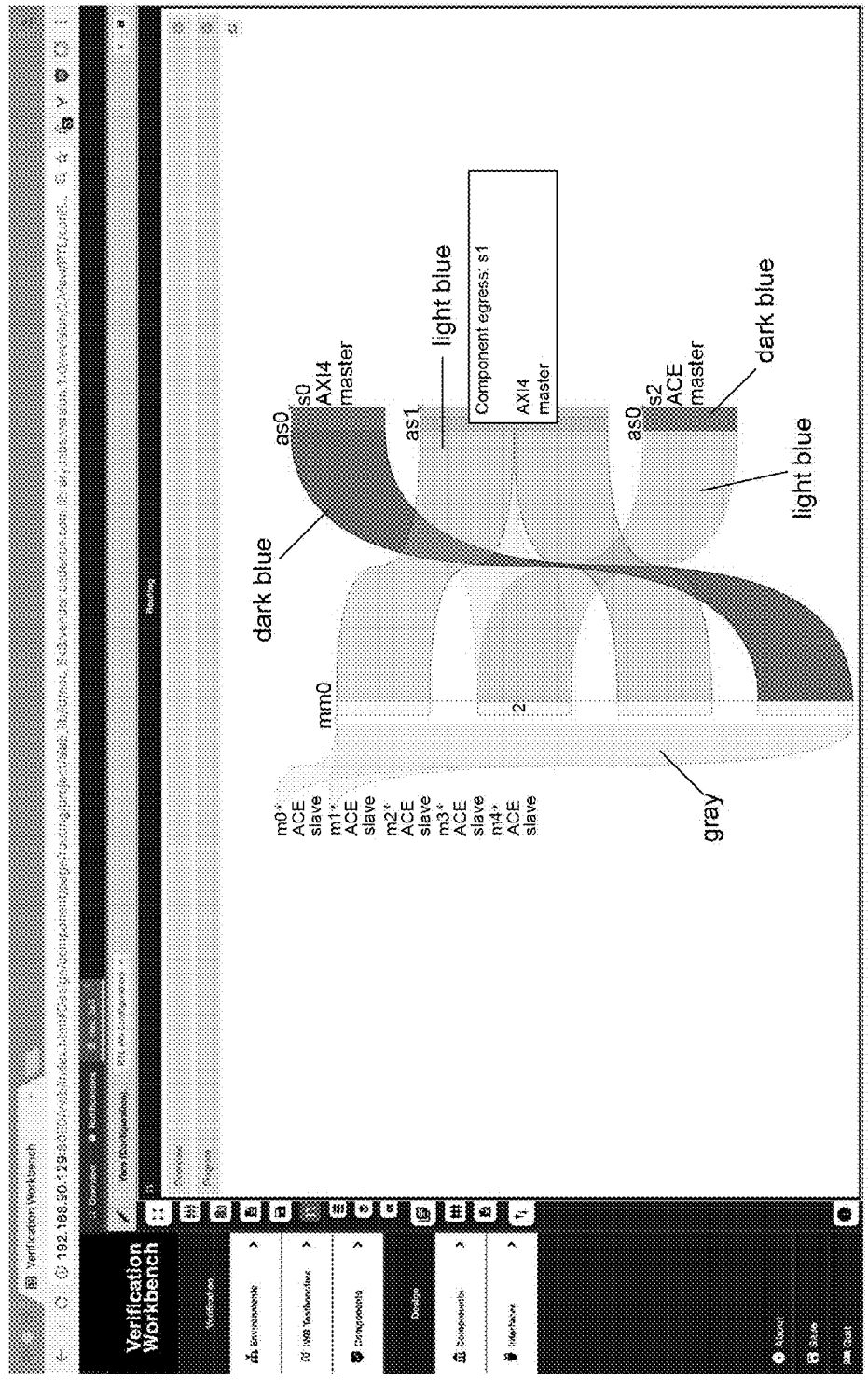
FIG. 32 is a diagram depicting a graphical user interface in accordance with an embodiment of the present disclosure.

Referring now to FIG. 32, a graphical user interface 3200 is provided, which may be configured to implement one or more operations associated with display process 10. In this particular embodiment a tooltip for an egress interface is shown.

Figure 33:
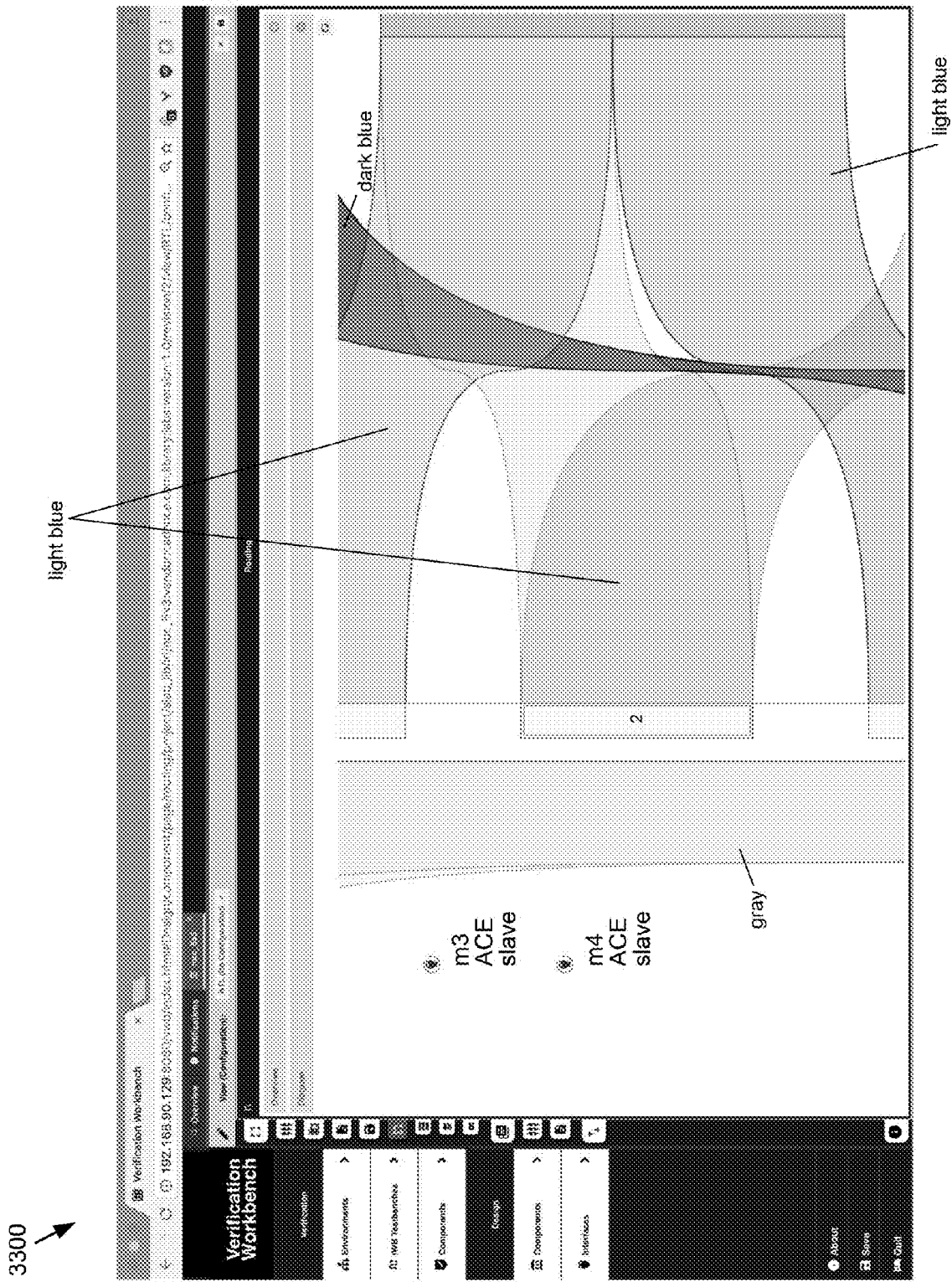
FIG. 33 is a diagram depicting a graphical user interface in accordance with an embodiment of the present disclosure.

Referring now to FIG. 33, a graphical user interface 3300 is provided, which may be configured to implement one or more operations associated with display process 10. In this particular embodiment pan and zoom functionality may be supported (e.g. using a mouse, etc.). An interleaved block is shown in the Figure.

Figure 34:
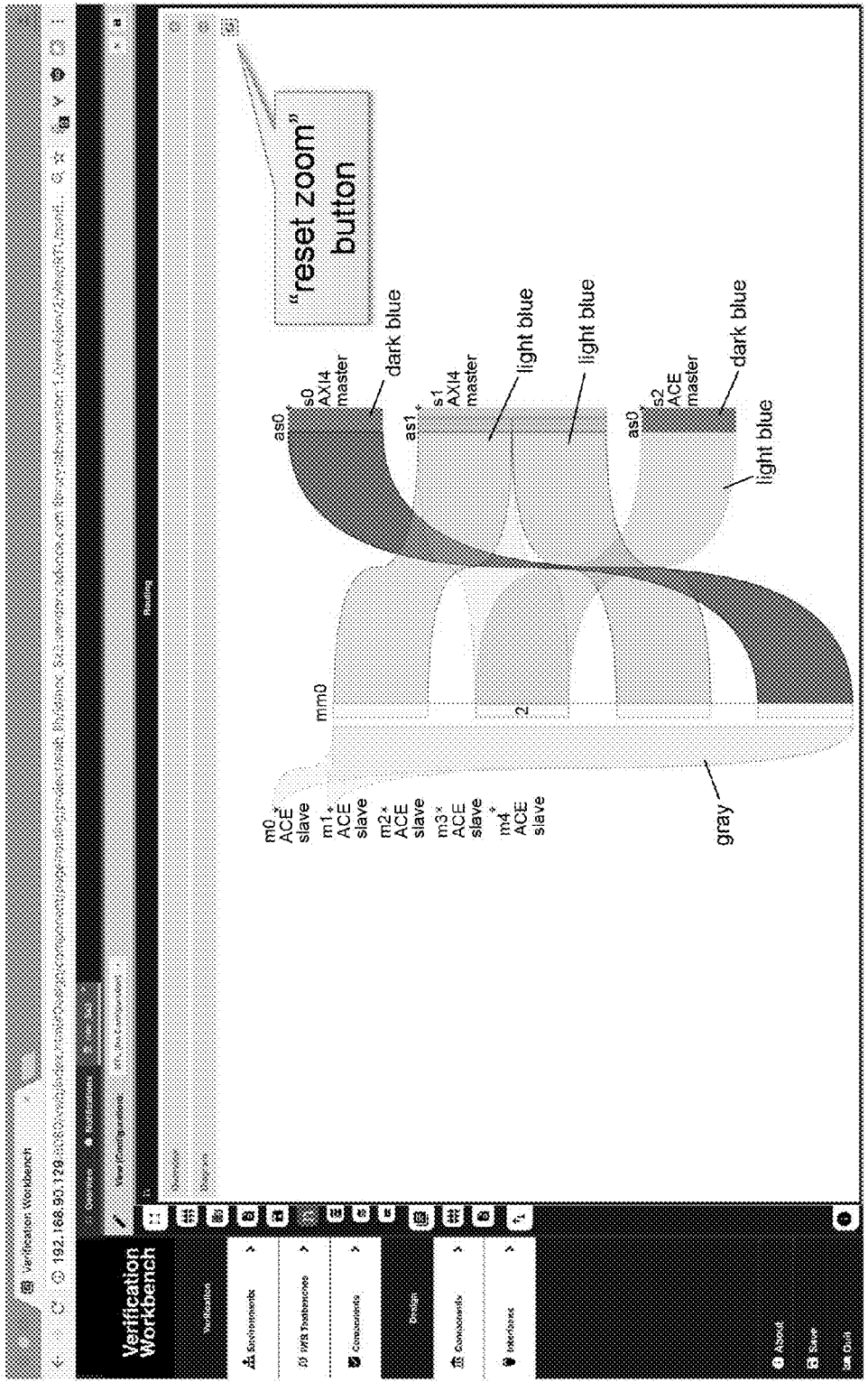
FIG. 34 is a diagram depicting a graphical user interface in accordance with an embodiment of the present disclosure.

Referring now to FIG. 34 a graphical user interface 3400 is provided, which may be configured to implement one or more operations associated with display process 10. In this particular embodiment a reset zoom option may be provided. Selecting the reset zoom option may reset the pan and zoom functionality to provide the full visibility of the diagram.

In some embodiments, current order of the diagram may preserve the order of definition in IPXACT. Additionally and/or alternatively, an alternative layout may be used to minimize the number of routes crossing each other, making the routes easier to follow overall.

In some embodiments, the various displays described above may be configured to provide the best view of the entire component routing data. In some embodiments, display process 10 may be used to select (e.g., by manual selection, using search, etc.) any of the participating items including, but not limited to, target/initiator interfaces, memory maps and address spaces, and to focus on that item. This focus action may hide any item that does not have a routing connection to this item, as well as reorganize the layout to minimize intersecting paths. Additionally, display process 10 may be configured to highlight a single route, for example, by hiding any non-participating item. A suitable title for this contextual focus may be presented, as well as an option to return to the full view.

In some embodiments, display process 10 may include a search option that may be configured to allow the user to locate in the diagram any item that matches a search pattern. The search pattern may include a string of characters or a regular expression to match the item name, and possibly a filter to indicate only items of a particular type are to be found (e.g., target interfaces, etc.).

In some embodiments, display process 10 may include a search option that may be configured to find the routing of a particular address. This may be used in a number of different variations. For example, for a target (ingoing) address this may be performed by selecting a memory map and indicating an address, the routes from this address may be highlighted, allowing to identify where this address is routed. Additionally and/or alternatively, for an initiator (outgoing) address this may be performed by selecting an address space and indicating an address in it, all routes reaching this address will be highlighted.

In some embodiments, display process 10 may include one or more automated editing options. Routing often follows patterns such as interleaving all/some of the initiator interfaces. Accordingly, display process 10 may include automated support for such patterns, so a user could specify that they are interested in an interleaving pattern, and instead of creating it manually, the necessary details may be asked and implemented automatically. Some advanced/automated editing options may include, but are not limited to, clone memory map or address space, bulk rename using a pattern, and/or copy all/parts of a routing description to/from another component, etc.

In some embodiments, display process 10 may be configured to add register files and internal memory blocks on one or more of memory maps and/or address spaces. It will be possible to add a register block and edit its contents. Once added, a block could be transferred between locations, as well as deleted. IPXACT registers are a nested tree-like structure, and may be edited using a customized (but otherwise standard) tree editor.

In some embodiments, from the point of view of a target (ingress) interface, the routing is perceived to be a continuous memory space, divided into non-overlapping blocks that may be mapped to a particular initiator (egress) interface, or an internal memory or register file. To help visualize this result, the user may be able to request this visualization, and see the memory space as it appears from a target interface. Additionally and/or alternatively, a user may be able to fully edit the component routing in such a simplified mode—merely indicating address ranges and destinations from the point of view of each target interface, and the correct full description may be created. This mode may be more verbose and less efficient than the full editing mode, but easier, and fully functional.

In some embodiments, display process 10 may be configured to allow the user to undo/redo steps. Additionally and/or alternatively, one of the features of IPXACT routing descriptions is remap states. They allow to indicate how routing is changed when certain conditions are met. Accordingly, it may be possible to indicate alternate routing and the condition to which they relate.

An example of the original IPXACT snippet is provided below. This is the part being visualized, which had to be extracted part by part from a much bigger file in which it was embedded:

```
<?xml version="1.0"encoding="utf-8"?>
<spirit:component
xmlns:spirit="http://www.spiritconsortium.org/XMLSchema/SPIRIT/
1685-2009" xmlns:xsi="http://www.w3.org/2001/XMLSchema-
instance"
xmlns:cadence="http://www.cadence.com/SPIRIT/1685-2009/
vendorExtensions"
```

-continued

```
xsi:schemaLocation="http://www.spiritconsortium.org/XMLSchema/
SPIRIT/1685-2009 http://www.spiritconsortium.org/XMLSchema/
SPIRIT/1685-2009/index.xsd">
  <spirit:busInterfaces>
    <spirit:busInterface>
      <spirit:name>m0</spirit:name>
      <spirit:slave>
        <spirit:memoryMapRef
spirit:memoryMapRef="memory map m0"/>
        <spirit:bridge spirit:masterRef="s0" spirit:opaque="true"/>
        <spirit:bridge spirit:masterRef="s1" spirit:opaque="true"/>
      </spirit:slave>
    </spirit:busInterface>
    <spirit:busInterface>
      <spirit:name>m1</spirit:name>
      <spirit:slave>
        <spirit:memoryMapRef
spirit:memoryMapRef="memory_map_m1"/>
        <spirit:bridge spirit:masterRef="s0" spirit:opaque="true"/>
        <spirit:bridge spirit:masterRef="s1" spirit:opaque="true"/>
        <spirit:bridge spirit:masterRef="s2" spirit:opaque="true"/>
      </spirit:slave>
    </spirit:busInterface>
    <spirit:busInterface>
      <spirit:name>m2</spirit:name>
      <spirit:slave>
        <spirit:memoryMapRef
spirit:memoryMapRef="memory_map_m2"/>
        <spirit:bridge spirit:masterRef="s2" spirit:opaque="true"/>
      </spirit:slave>
    </spirit:busInterface>
    <spirit:busInterface>
      <spirit:name>s0</spirit:name>
      <spirit:master>
        <spirit:addressSpaceRef
spirit:addressSpaceRef="address_space_s0"/>
      </spirit:master>
    </spirit:busInterface>
    <spirit:busInterface>
      <spirit:name>s1</spirit:name>
      <spirit:master>
        <spirit:addressSpaceRef
spirit:addressSpaceRef="address_space_s1"/>
      </spirit:master>
    </spirit:busInterface>
    <spirit:busInterface>
      <spirit:name>s2</spirit:name>
      <spirit:master>
        <spirit:addressSpaceRef
spirit:addressSpaceRef="address_space_s2"/>
      </spirit:master>
    </spirit:busInterface>
  </spirit:busInterfaces>
  <spirit:addressSpaces>
    <spirit:addressSpace>
      <spirit:name>address_space_s0</spirit:name>
      <spirit:range>0x10000</spirit:range>
      <spirit:width>32</spirit:width>
      <spirit:segments>
        <spirit:segment>
          <spirit:name lower_half</spirit:name>
          <spirit:addressOffset>0x0</spirit:addressOffset>
          <spirit:range>0x8000</spirit:range>
        </spirit:segment>
      </spirit:segments>
      <spirit:addressUnitBits>8</spirit:addressUnitBits>
    </spirit:addressSpace>
    <spirit:addressSpace>
      <spirit:name>address_space_s1</spirit:name>
      <spirit:range>0x6000</spirit:range>
      <spirit:width>32</spirit:width>
      <spirit:segments>
        <spirit:segment>
          <spirit:name>lower_half</spirit:name>
          <spirit:addressOffset>0x0</spirit:addressOffset>
          <spirit:range>0x3000</spirit:range>
        </spirit:segment>
        <spirit:segment>
          <spirit:name_upper_half</spirit:name>
```

```
            <spirit:addressOffset>0x3000</spirit:addressOffset>
            <spirit:range>0x3000</spirit:range>
          </spirit:segment>
        </spirit:segments>
        <spirit:addressUnitBits>8</spirit:addressUnitBits>
      </spirit:addressSpace>
      <spirit:addressSpace>
        <spirit:name>address_space_s2</spirit:name>
        <spirit:range>0x18000</spirit:range>
        <spirit:width>32</spirit:width>
        <spirit:segments>
          <spirit:segment>
            <spirit:name>small</spirit:name>
            <spirit:addressOffset>0x0</spirit:addressOffset>
            <spirit:range>0x1000</spirit:range>
          </spirit:segment>
          <spirit:segment>
            <spirit:name>overlap_small</spirit:name>
            <spirit:addressOffset>0x0</spirit:addressOffset>
            <spirit:range>0x1000</spirit:range>
          </spirit:segment>
          <spirit:segment>
            <spirit:name>overlap_big</spirit:name>
            <spirit:addressOffset>0x0</spirit:addressOffset>
            <spirit:range>0x10000</spirit:range>
          </spirit:segment>
          <spirit:segment>
            <spirit:name>overlap_offset</spirit:name>
            <spirit:addressOffset>0xF000</spirit:addressOffset>
            <spirit:range>0x3000</spirit:range>
          </spirit:segment>
        </spirit:segments>
        <spirit:addressUnitBits>8</spirit:addressUnitBits>
      </spirit:addressSpace>
    </spirit:addressSpaces>
    <spirit:memoryMaps>
      <spirit:memoryMap>
        <spirit:name>memory_map_m0</spirit:name>
        <spirit:subspaceMap spirit:masterRef="s0">
          <spirit:name>subspacemap_s0_0</spirit:name>
          <spirit:baseAddress>0x0</spirit:baseAddress>
        </spirit:subspaceMap>
        <spirit:subspaceMap spirit:masterRef="s1" spirit:segmentRef="upper_half">
          <spirit:name>subspacemap_s1_1</spirit:name>
          <spirit:baseAddress>0x10000</spirit:baseAddress>
        </spirit:subspaceMap>
        <spirit:addressUnitBits>0</spirit:addressUnitBits>
      </spirit:memoryMap>
      <spirit:memoryMap>
        <spirit:name>memory_map_m1</spirit:name>
        <spirit:subspaceMap spirit:masterRef="s0" spirit:segmentRef="lower_half">
          <spirit:name>subspacemap_s0_0</spirit:name>
          <spirit:baseAddress>0x0</spirit:baseAddress>
        </spirit:subspaceMap>
        <spirit:subspaceMap spirit:masterRef="s1" spirit:segmentRef="lower_half">
          <spirit:name>subspacemap_s1_1</spirit:name>
          <spirit:baseAddress>0x8000</spirit:baseAddress>
        </spirit:subspaceMap>
        <spirit:subspaceMap spirit:masterRef="s1" spirit:segmentRef="upper_half">
          <spirit:name>subspacemap_s1_3</spirit:name>
          <spirit:baseAddress>0xB000</spirit:baseAddress>
        </spirit:subspaceMap>
        <spirit:subspaceMap spirit:masterRef="s2" spirit:segmentRef="small">
          <spirit:name>subspacemap_s2_4</spirit:name>
          <spirit:baseAddress>0xE000</spirit:baseAddress>
        </spirit:subspaceMap>
        <spirit:addressUnitBits>0</spirit:addressUnitBits>
      </spirit:memoryMap>
      <spirit:memoryMap>
        <spirit:name>memory_map_m2</spirit:name>
        <spirit:subspaceMap spirit:masterRef="s2" spirit:segmentRef="overlap_small">
          <spirit:name>subspacemap_s2_0</spirit:name>
          <spirit:baseAddress>0x0</spirit:baseAddress>
        </spirit:subspaceMap>
        <spirit:subspaceMap spirit:masterRef="s2" spirit:segmentRef="overlap_big">
          <spirit:name>subspacemap_s2_1</spirit:name>
          <spirit:baseAddress>0x1000</spirit:baseAddress>
        </spirit:subspaceMap>
        <spirit:addressUnitBits>0</spirit:addressUnitBits>
      </spirit:memoryMap>
    </spirit:memoryMaps>
</spirit:component>
```

As used in any embodiment described herein, the terms "circuit" and "circuitry" may include, for example, singly or in any combination, hardwired circuitry, programmable circuitry, state machine circuitry, and/or firmware that stores instructions executed by programmable circuitry. It should be understood at the outset that any of the operations and/or operative components described in any embodiment herein may be implemented in software, firmware, hardwired circuitry and/or any combination thereof. Embodiments of the present disclosure may be incorporated in whole or in part into any design tools.

It will be apparent to those skilled in the art that various modifications and variations can be made in the embodiments of the present disclosure without departing from the spirit or scope of the present disclosure. Thus, it is intended that embodiments of the present disclosure cover the modifications and variations provided they come within the scope of the appended claims and their equivalents.

What is claimed is:

1. A computer implemented method for visualizing one or more IP-XACT component data routes comprising:
   receiving, using at least one processor, an IP-XACT description of one or more design elements including at least one target ingress interface, and at least one of an initiator egress interface, a memory map and an address space;
   analyzing, using the at least one processor, the IP-XACT description of the one or more design elements; and
   displaying a graphical user interface, based upon, at least in part, the IP-XACT description of one or more design elements, wherein the graphical user interface is configured to display the at least one target ingress interface, the initiator egress interface, and to display the memory map between the at least one target ingress interface and the initiator egress interface to display an IP-XACT component data route therebetween.

2. The computer implemented method of claim 1, wherein each memory map is configured to be created, deleted, or assigned to a particular target.

3. The computer implemented method of claim 1, wherein the initiator egress interface is addressable and includes an assigned address space.

4. The computer implemented method of claim 3, wherein the assigned address space is configured to be adjusted at the graphical user interface.

5. The computer implemented method of claim 3, wherein the assigned address space is segmented into a subrange associated with the assigned address space.

6. The computer implemented method of claim 3, wherein the assigned address space is assigned a color for display at the graphical user interface.

7. The computer implemented method of claim 1, further comprising:
   applying a reference scale to one or more connections associated with the graphical user interface.

8. A non-transitory computer readable medium having stored thereon instructions, which when executed by a processor result in one or more operations, the operations comprising:

receiving, using at least one processor, an IP-XACT description of one or more design elements including at least one target ingress interface, and at least one of an initiator egress interface, a memory map and an address space;

analyzing, using the at least one processor, the IP-XACT description of the one or more design elements; and displaying a graphical user interface, based upon, at least in part, the IP-XACT description of one or more design elements, wherein the graphical user interface is configured to display the at least one target ingress interface, the initiator egress interface, and to display the memory map between the at least one target ingress interface and the initiator egress interface.

9. The computer readable medium of claim 8, wherein each memory map is configured to be created, deleted, or assigned to a particular target.

10. The computer readable medium of claim 8, wherein the initiator egress interface is addressable and includes an assigned address space.

11. The computer readable medium of claim 10, wherein the assigned address space is configured to be adjusted at the graphical user interface.

12. The computer readable medium of claim 10, wherein the assigned address space is segmented into a subrange associated with the assigned address space.

13. The computer readable medium of claim 10, wherein the assigned address space is assigned a color for display at the graphical user interface.

14. The computer readable medium of claim 8, further comprising:

applying a reference scale to one or more connections associated with the graphical user interface.

15. A system for visualizing one or more IP-XACT component data routes comprising:

at least one processor configured to receive an IP-XACT description of one or design elements, the at least one processor further configured to analyzing the IP-XACT description of the one or more design elements including at least one target ingress interface, and at least one of an initiator egress interface, a memory map and an address space, the at least one processor further configured to display a graphical user interface, based upon, at least in part, the IP-XACT description of one or more design elements, wherein the graphical user interface is configured to display a graphical user interface, based upon, at least in part, the IP-XACT description of one or more design elements, wherein the graphical user interface is configured to display the at least one target ingress interface, the initiator egress interface, and the address space.

16. The system of claim 15, wherein each memory map is configured to be created, deleted, or assigned to a particular target.

17. The system of claim 15, wherein the initiator egress interface is addressable and includes an assigned address space.

18. The system of claim 17, wherein the assigned address space is configured to be adjusted at the graphical user interface.

19. The system of claim 17, wherein the assigned address space is segmented into a subrange associated with the assigned address space.

20. The system of claim 15, wherein the at least one processor is further configured to apply a reference scale to one or more connections associated with the graphical user interface.

* * * * *